(12) United States Patent
Takai et al.

(10) Patent No.: US 8,451,832 B2
(45) Date of Patent: May 28, 2013

(54) CONTENT USING APPARATUS, CONTENT USING METHOD, DISTRIBUTION SERVER APPARATUS, INFORMATION DISTRIBUTION METHOD, AND RECORDING MEDIUM

(75) Inventors: Motoyuki Takai, Tokyo (JP); Kosei Yamashita, Kanagawa (JP); Yasushi Miyajima, Kanagawa (JP); Yoichiro Sako, Tokyo (JP); Toshiro Terauchi, Tokyo (JP); Toru Sasaki, Tokyo (JP); Yuichi Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1333 days.

(21) Appl. No.: 11/259,585

(22) Filed: Oct. 26, 2005

(65) Prior Publication Data
US 2006/0112411 A1    May 25, 2006

(30) Foreign Application Priority Data

Oct. 26, 2004    (JP) ............... P2004-310874

(51) Int. Cl.
*H04L 12/26*    (2006.01)
*H04L 12/28*    (2006.01)
*G06F 3/03*     (2006.01)

(52) U.S. Cl.
CPC ....................... *G06F 3/03* (2013.01)
USPC ........................... 370/389; 725/50

(58) Field of Classification Search
None
See application file for complete search history.

(56) References Cited

U.S. PATENT DOCUMENTS

| | | | |
|---|---|---|---|
| 4,776,323 A | 10/1988 | Spector | |
| 5,002,491 A | 3/1991 | Abrahamson et al. | |
| 5,119,474 A | 6/1992 | Beitel et al. | |
| 5,137,501 A | 8/1992 | Mertesdorf | |
| 5,648,627 A | 7/1997 | Usa | |
| 5,952,598 A * | 9/1999 | Goede | 84/609 |
| 6,157,744 A * | 12/2000 | Nagasaka et al. | 382/236 |
| 6,230,192 B1 | 5/2001 | Roberts et al. | |
| 6,336,891 B1 | 1/2002 | Fedrigon et al. | |
| 6,349,275 B1 | 2/2002 | Schumacher et al. | |
| 6,389,222 B1 | 5/2002 | Ando et al. | |
| 6,390,923 B1 * | 5/2002 | Yoshitomi et al. | 463/43 |

(Continued)

FOREIGN PATENT DOCUMENTS

| | | |
|---|---|---|
| EP | 1 039 400 A2 | 9/2000 |
| EP | 1 128 358 A1 | 8/2001 |

(Continued)

OTHER PUBLICATIONS

Shih-Fu Chang, Thomas Sikora and Atul Puri, Overview of the MPEG-7 Standard, IEEE Transactions on Circuits and Systems for Video Technology, vol. 11 No. 6, Jun. 2001, pp. 688-695.*

(Continued)

*Primary Examiner* — John Blanton
*Assistant Examiner* — Christopher Crutchfield
(74) *Attorney, Agent, or Firm* — Wolf, Greenfield & Sacks, P.C.

(57) ABSTRACT

A content using apparatus includes an obtaining unit configured to obtain delimiter information for content data recorded on a recording medium; an accepting unit configured to accept input of an instruction by a user; and a generating unit configured to generate content data from content data subject to processing to allow playback of content in a new manner, on the basis of the delimiter information obtained by the obtaining unit and the instruction accepted by the accepting unit.

20 Claims, 14 Drawing Sheets

U.S. PATENT DOCUMENTS

| | | | |
|---|---|---|---|
| 6,408,128 B1* | 6/2002 | Abecassis | 386/239 |
| 6,570,078 B2 | 5/2003 | Ludwig | |
| 6,578,047 B1 | 6/2003 | Deguchi | |
| 6,662,231 B1 | 12/2003 | Drosset et al. | |
| 6,697,824 B1 | 2/2004 | Bowman-Amuah | |
| 6,704,729 B1 | 3/2004 | Klein et al. | |
| 6,757,482 B1* | 6/2004 | Ochiai et al. | 386/83 |
| 6,807,558 B1 | 10/2004 | Hassett et al. | |
| 6,813,438 B1 | 11/2004 | Bates et al. | |
| 6,839,680 B1 | 1/2005 | Liu et al. | |
| 6,868,440 B1* | 3/2005 | Gupta et al. | 709/219 |
| 6,888,999 B2* | 5/2005 | Herberger et al. | 386/278 |
| 6,944,542 B1 | 9/2005 | Eschenbach | |
| 6,944,621 B1* | 9/2005 | Collart | 1/1 |
| 7,161,887 B2 | 1/2007 | Snow et al. | |
| 7,260,402 B1 | 8/2007 | Ahmed | |
| 7,293,066 B1 | 11/2007 | Day | |
| 7,320,137 B1* | 1/2008 | Novak et al. | 725/134 |
| 7,346,920 B2* | 3/2008 | Lamkin et al. | 725/112 |
| 7,392,481 B2* | 6/2008 | Gewickey et al. | 715/716 |
| 7,395,549 B1 | 7/2008 | Perlman et al. | |
| 7,451,177 B1 | 11/2008 | Johnson et al. | |
| 7,464,137 B2 | 12/2008 | Zhu et al. | |
| 7,521,623 B2 | 4/2009 | Bowen | |
| 7,521,624 B2 | 4/2009 | Asukai et al. | |
| 7,542,816 B2 | 6/2009 | Rosenberg | |
| 7,546,626 B2* | 6/2009 | Ohnuma | 725/136 |
| 7,790,976 B2 | 9/2010 | Takai et al. | |
| 7,894,424 B2 | 2/2011 | Sako et al. | |
| 7,930,385 B2 | 4/2011 | Takai et al. | |
| 2001/0010754 A1 | 8/2001 | Ando et al. | |
| 2001/0014620 A1* | 8/2001 | Nobe et al. | 463/7 |
| 2001/0015123 A1 | 8/2001 | Nishitani et al. | |
| 2001/0043198 A1 | 11/2001 | Ludtke | |
| 2001/0055038 A1 | 12/2001 | Kim | |
| 2002/0056142 A1 | 5/2002 | Redmond | |
| 2002/0073417 A1 | 6/2002 | Kondo et al. | |
| 2002/0085833 A1* | 7/2002 | Miyauchi | 386/96 |
| 2002/0104101 A1 | 8/2002 | Yamato et al. | |
| 2002/0108112 A1* | 8/2002 | Wallace et al. | 725/40 |
| 2002/0152122 A1 | 10/2002 | Chino et al. | |
| 2003/0007777 A1 | 1/2003 | Okajima et al. | |
| 2003/0018622 A1 | 1/2003 | Chau | |
| 2003/0026433 A1 | 2/2003 | Matt | |
| 2003/0034996 A1* | 2/2003 | Li et al. | 345/719 |
| 2003/0060728 A1 | 3/2003 | Mandigo | |
| 2003/0065665 A1 | 4/2003 | Kinjo | |
| 2003/0069893 A1 | 4/2003 | Kanai et al. | |
| 2003/0076348 A1* | 4/2003 | Najdenovski | 345/727 |
| 2003/0088647 A1 | 5/2003 | ShamRao | |
| 2003/0093790 A1 | 5/2003 | Logan et al. | |
| 2003/0113096 A1 | 6/2003 | Taira et al. | |
| 2003/0126604 A1* | 7/2003 | Suh | 725/38 |
| 2003/0163693 A1 | 8/2003 | Medvinsky | |
| 2003/0212810 A1 | 11/2003 | Tsusaka et al. | |
| 2004/0000225 A1 | 1/2004 | Nishitani et al. | |
| 2004/0044724 A1 | 3/2004 | Bell et al. | |
| 2004/0049405 A1 | 3/2004 | Buerger et al. | |
| 2004/0064209 A1 | 4/2004 | Zhang | |
| 2004/0126038 A1 | 7/2004 | Aublant et al. | |
| 2004/0220830 A1 | 11/2004 | Moreton et al. | |
| 2004/0252397 A1 | 12/2004 | Hodge et al. | |
| 2004/0255335 A1 | 12/2004 | Fickle et al. | |
| 2004/0259529 A1 | 12/2004 | Suzuki | |
| 2005/0041951 A1 | 2/2005 | Inoue et al. | |
| 2005/0102365 A1 | 5/2005 | Moore et al. | |
| 2005/0126370 A1 | 6/2005 | Takai et al. | |
| 2005/0241465 A1 | 11/2005 | Goto | |
| 2005/0249080 A1 | 11/2005 | Foote et al. | |
| 2005/0278758 A1 | 12/2005 | Bodlaender | |
| 2005/0288991 A1 | 12/2005 | Hubbard et al. | |
| 2006/0078297 A1 | 4/2006 | Nishikawa et al. | |
| 2006/0087925 A1 | 4/2006 | Takai et al. | |
| 2006/0107822 A1 | 5/2006 | Bowen | |
| 2006/0174291 A1 | 8/2006 | Takai et al. | |
| 2006/0189902 A1 | 8/2006 | Takai et al. | |
| 2006/0190413 A1 | 8/2006 | Harper | |
| 2006/0220882 A1 | 10/2006 | Makino | |
| 2006/0243120 A1 | 11/2006 | Takai et al. | |
| 2006/0245599 A1 | 11/2006 | Regnier | |
| 2006/0250994 A1 | 11/2006 | Sasaki et al. | |
| 2007/0005655 A1 | 1/2007 | Takehara et al. | |
| 2007/0025194 A1 | 2/2007 | Morse et al. | |
| 2007/0044010 A1 | 2/2007 | Sull et al. | |
| 2007/0067311 A1 | 3/2007 | Takai et al. | |
| 2007/0074253 A1 | 3/2007 | Takai et al. | |
| 2007/0074619 A1 | 4/2007 | Vergo | |
| 2007/0085759 A1 | 4/2007 | Lee et al. | |
| 2007/0098354 A1 | 5/2007 | Ando et al. | |
| 2007/0186752 A1 | 8/2007 | Georges et al. | |
| 2007/0204744 A1 | 9/2007 | Sako et al. | |
| 2007/0221045 A1 | 9/2007 | Terauchi et al. | |
| 2007/0265720 A1 | 11/2007 | Sako et al. | |
| 2008/0153671 A1 | 6/2008 | Ogg et al. | |
| 2009/0028009 A1 | 1/2009 | Johnson et al. | |
| 2011/0016149 A1 | 1/2011 | Sako et al. | |

FOREIGN PATENT DOCUMENTS

| | | |
|---|---|---|
| EP | 1 160 651 A1 | 12/2001 |
| EP | 1 320 101 A | 6/2003 |
| EP | 1 503 376 A2 | 2/2005 |
| EP | 1 705 588 A1 | 9/2006 |
| EP | 1 729 290 A1 | 12/2006 |
| EP | 1 746 520 A2 | 1/2007 |
| JP | 04-044096 | 2/1992 |
| JP | 05-273971 A | 10/1993 |
| JP | 06-290574 A | 10/1994 |
| JP | 07-064547 A | 3/1995 |
| JP | 07-110681 A | 4/1995 |
| JP | 08-152880 A | 6/1996 |
| JP | 08-286663 A | 11/1996 |
| JP | 08-322014 A | 12/1996 |
| JP | 08-328555 A | 12/1996 |
| JP | 09-107517 A | 4/1997 |
| JP | 10-055174 A | 2/1998 |
| JP | 10-124047 A | 5/1998 |
| JP | 10-254445 A | 9/1998 |
| JP | 11-126067 A | 5/1999 |
| JP | 2000-003174 A | 1/2000 |
| JP | 2000-020054 A | 1/2000 |
| JP | 2000-207263 A | 7/2000 |
| JP | 2000-214851 A | 8/2000 |
| JP | 3088409 B2 | 9/2000 |
| JP | 2000-285059 A | 10/2000 |
| JP | 2001-022350 A | 1/2001 |
| JP | 2001-075995 A | 3/2001 |
| JP | 3147888 B2 | 3/2001 |
| JP | 2001-166772 A | 6/2001 |
| JP | 2001-282813 A | 10/2001 |
| JP | 2001-297090 A | 10/2001 |
| JP | 2001-299980 A | 10/2001 |
| JP | 2001-321564 A | 11/2001 |
| JP | 2001-324984 | 11/2001 |
| JP | 2001-325787 A | 11/2001 |
| JP | 2001-357008 A | 12/2001 |
| JP | 2001-359096 A | 12/2001 |
| JP | 2002-023746 A | 1/2002 |
| JP | 2002-049631 A | 2/2002 |
| JP | 2002-092013 A | 3/2002 |
| JP | 2002-108918 A | 4/2002 |
| JP | 2002-189663 A | 7/2002 |
| JP | 2002-238022 A | 8/2002 |
| JP | 2002-251185 A | 9/2002 |
| JP | 2002-282227 A | 10/2002 |
| JP | 2002-330411 A | 11/2002 |
| JP | 2003-023589 A | 1/2003 |
| JP | 2003-037856 A | 2/2003 |
| JP | 2003-050816 A | 2/2003 |
| JP | 2003-058770 A | 2/2003 |
| JP | 2003-150173 A | 5/2003 |
| JP | 2003-157375 A | 5/2003 |
| JP | 2003-162285 A | 6/2003 |
| JP | 2003-177749 A | 6/2003 |
| JP | 2003-224677 A | 8/2003 |
| JP | 2004-073272 A | 3/2004 |
| JP | 2004-078467 A | 3/2004 |
| JP | 2004-139576 A | 5/2004 |

| | | |
|---|---|---|
| JP | 2004-151855 A | 5/2004 |
| JP | 2004-173102 | 6/2004 |
| JP | 2004-185535 A | 7/2004 |
| JP | 2004-199667 A | 7/2004 |
| JP | 2004-222239 A | 8/2004 |
| JP | 2004-226625 A | 8/2004 |
| JP | 2004-234807 A | 8/2004 |
| JP | 2004-526372 A | 8/2004 |
| JP | 2004-252654 A | 9/2004 |
| JP | 2004-259313 A | 9/2004 |
| JP | 2004-259430 A | 9/2004 |
| JP | 2004-282775 A | 10/2004 |
| JP | 2004-317819 A | 11/2004 |
| JP | 2004-326840 A | 11/2004 |
| JP | 2004-361713 A | 12/2004 |
| JP | 2004-362145 A | 12/2004 |
| JP | 2004-362489 A | 12/2004 |
| JP | 2004-362601 A | 12/2004 |
| JP | 3598613 B2 | 12/2004 |
| JP | 2005-004604 A | 1/2005 |
| JP | 2005-043916 A | 2/2005 |
| JP | 2005-062971 A | 3/2005 |
| JP | 2005-084336 A | 3/2005 |
| JP | 2005-093068 A | 4/2005 |
| JP | 2005-107867 A | 4/2005 |
| JP | 2005-156641 A | 6/2005 |
| JP | 2005-196918 A | 7/2005 |
| JP | 2005-202319 A | 7/2005 |
| NL | 1023191 C2 | 10/2004 |
| WO | WO 93/22762 A1 | 11/1993 |
| WO | WO 01/82302 A1 | 11/2001 |
| WO | WO 02/05124 A1 | 1/2002 |
| WO | WO 02/080524 A2 | 10/2002 |
| WO | WO 02/093344 A1 | 11/2002 |
| WO | WO 03/043007 A2 | 5/2003 |
| WO | WO 2004/023358 A1 | 3/2004 |
| WO | WO 2004/077706 A1 | 9/2004 |

OTHER PUBLICATIONS

Andrew McParland, Masataka Sumikura, Koichi Takeuchi, Keith Miller, Frans de Jong, Keiichi Yamamoto, Kawamori Masahito, Andrew Hickman, Yasuaki Yamagishi, Marijan Leban and Wataru Kameyama, Exchanging TV—Anytime Metadata over IP Networks, Document AN462 Submitted to the TC-Anytime Forum, Sep. 17, 2002, pp. 1-38.*

Michael Jerome Hawley, Structure out of Sound, MIT PhD Thesis, pp. 15-54, 78-108 and 130-154.*

K. O'Keefe, Dancing Monkeys, Masters Project, Jun. 18, 2003, pp. 1-66.*

Author Unknown, METS: An Overview & Tutorial, retrieved from the Internet Archive, www.archive.org, as archived on Aug. 8, 2004, pp. 1-7.*

Author Unknown, METS Schema Documentation, retrieved from the Internet Archive, www.archive.org, as archived on Aug. 10, 2004, pp. 1-25.*

Hawley, Structure out of sound. MIT PhD Thesis. 1993, pp. 1-185.

Koike et al., Timeslider: an interface to specify time point. Proc. of the ACM $10^{th}$ Annual Symposium on User Interface Software and Technology. Oct. 17, 1997, pp. 43-44, Alberta, Canada.

Little et al., A digital on-demand video service supporting content-based queries. http://portal.acm.org/ft_gateway.cfm?id=168450&type=pdf&coll=GUIDE&dl=GUIDE&CFID=16387603&CFTOKEN=17953305. Proc. of the First ACM International Conference on Multimedia. New York, Aug. 1, 1993, 9 pages, XP-002429294.

Zhang et al., Database and metadata support of a web-based multimedia digital library for medical education. http://www.springerlink.com/content/69Ohglrxv19gwy2q/fulltext.pdf. Proc. of the First International Conference on Advances in Web-based Learning, ICWL 2002. China, Aug. 17, 2002, pp. 339-350, XP002429295.

* cited by examiner

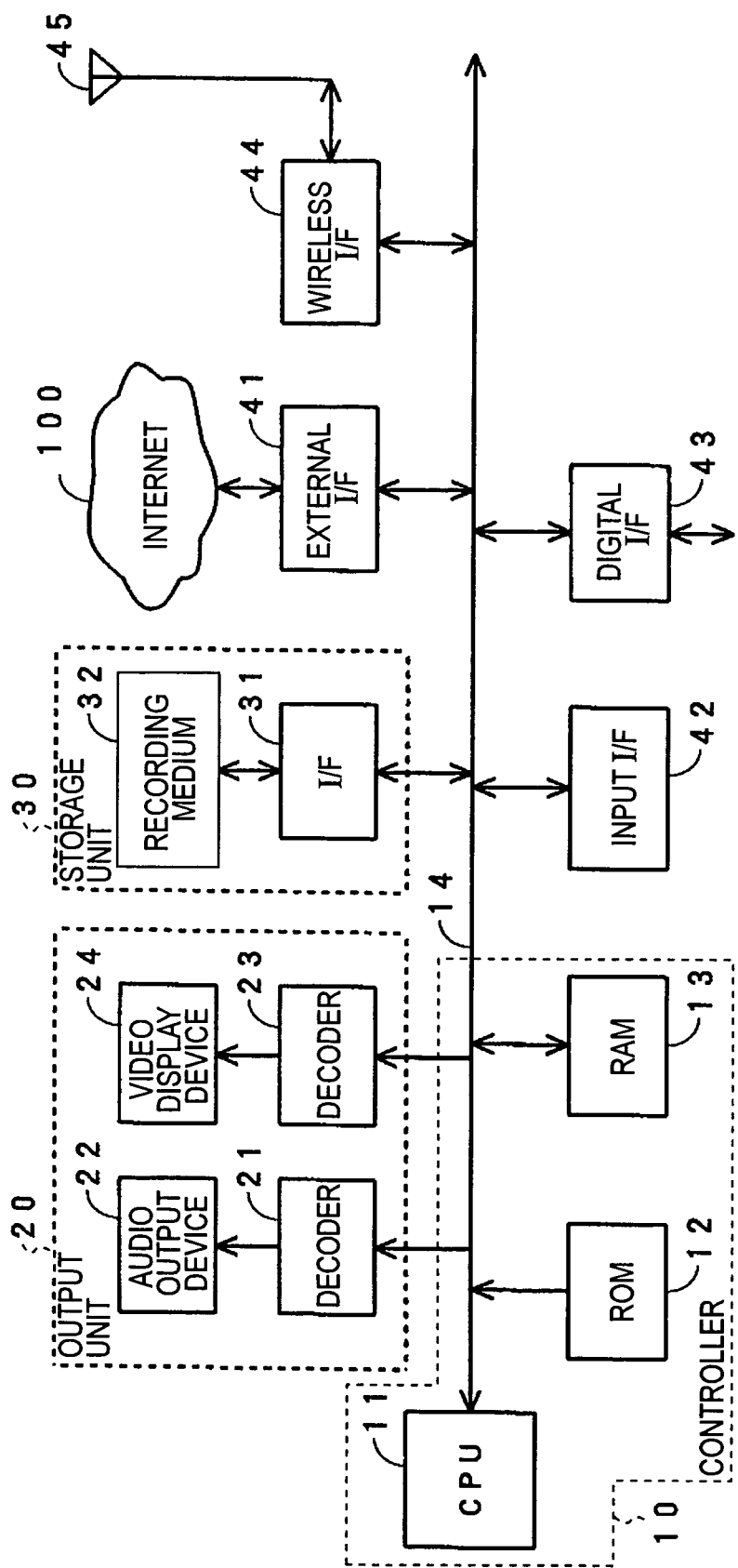

CONTENT USING APPARATUS, CONTENT USING METHOD, DISTRIBUTION SERVER APPARATUS, INFORMATION DISTRIBUTION METHOD, AND RECORDING MEDIUM

CROSS REFERENCES TO RELATED APPLICATIONS

The present invention contains subject matter related to Japanese Patent Application JP 2004-310874 filed in the Japanese Patent Office on Oct. 26, 2004, the entire contents of which are incorporated herein by reference.

BACKGROUND OF THE INVENTION

1. Field of the Invention

The present invention relates to apparatuses and methods for using content data, such as music content data or video content data, apparatuses and methods for distributing information that is used for the apparatuses and methods for using content data, and recording media having recorded content and associated information thereon.

2. Description of the Related Art

Various kinds of music content are abundantly provided via recording media such as compact discs (CDs) or via transmission media such as the Internet. Various techniques have been proposed so that users can use such abundant music content in various manners according to the users' needs.

For example, in a playback apparatus disclosed in Japanese Unexamined Patent Application Publication No. 8-55464, positions of bars of music content that is recorded on a CD, an MD (MINI DISC®), or the like are automatically calculated so that it is possible to display bar numbers of the music content or to start playback from a specified bar. With the playback apparatus, it is possible, for example, to accurately recognize the bar numbers of the respective bars of the music content, simply locate the playback position to the beginning of an intended bar, and to repeatedly play back only the bar. This serves to improve the efficiency of learning the music or practice for playing the music.

According to an apparatus disclosed in Japanese Unexamined Patent Application Publication No. 2003-177784, it is possible to extract points of acoustic change, such as a highlight portion of music content, from audio signals (acoustic signals) of a piece of music (music content). With this apparatus, it is possible to start playback from the beginning of a piece of music, the second chorus, a highlight portion, or the like. Thus, it is relatively easy to extract or play back a desired part of audio content.

With these techniques, it is possible to enjoy music content more flexibly and effectively.

SUMMARY OF THE INVENTION

However, according to the apparatus disclosed in Japanese Unexamined Patent Application Publication No. 8-55464, information representing bar delimiters is supposed to be input by a user. As for the apparatus disclosed in Japanese Unexamined Patent Application Publication No. 2003-177784, it is supposed that music content is analyzed in advance by a user. That is, some preparation is done to use certain music content in an intended manner. The preparation can be laborious for the user or can take time, inhibiting convenient use.

Recently, with abundantly provided music content data or video content data, demand is being raised for searching or repetition of an arbitrary bar, locating a point of change in music, real-time editing by a user, or processing of a desired part of content for reconstruction. That is, instead of using abundantly provided music content or video content as it is, demand is being raised for using content in various manners according to users' preferences.

However, when music content, video content, or AV (audio/visual) content in which audio data and video data are synchronized, such as a movie, is processed or reconstructed, it is prohibited to specify relevant parts and to process or reconstruct the content without temporal delimiter information of the content. If temporal delimiter information can be obtained only through making preparations as disclosed in the documents mentioned above, simple use of content could be prohibited.

It is desired that an apparatus, a method, and a recording medium be provided so that it is possible to accurately identify intended parts of various content, such as music content, video content, or AV content, and to readily reedit or reconstruct content, such as processing the identified parts, or for replacing identified parts with other identified parts.

According to an embodiment of the present invention, there is provided a content using apparatus including obtaining means for obtaining delimiter information for content data recorded on a recording medium; accepting means for accepting input of an instruction by a user; and generating means for generating content data from content data subject to processing to allow playback of content in a new manner, on the basis of the delimiter information obtained by the obtaining means and the instruction accepted by the accepting means.

According to the content using apparatus, delimiter information for content data subject to process (content data that is to be used) is obtained by the obtaining means, and new content data is generated from content data subject to processing by the generating means on the basis of the delimiter information obtained and an instruction input by a user and accepted by the accepting means, for example, by processing data of a target segment or deleting or replacing data of a target segment.

Accordingly, without user's labor or time, accurate delimiter information for each piece of content data can be automatically obtained by the obtaining means. Furthermore, it is possible to reedit or reconstruct existing content data on the basis of delimiter information and instructions input by the user to generate and play back new content data and enjoy the content data.

According to another embodiment of the present invention, there is provided a content using method including the steps of obtaining delimiter information for content data recorded on a recording medium; accepting input of an instruction by a user; and generating content data from content data subject to processing to allow playback of content in a new manner, on the basis of the delimiter information obtained and the instruction accepted.

According to another embodiment of the present invention, there is provided a server apparatus for distributing delimiter information, the server apparatus including storage means for storing delimiter information for a large number of pieces of content data; receiving means for receiving a request for providing delimiter information, the request including a content data identifier and being transmitted via a network; searching means for searching the storage means for delimiter information for target content data, on the basis of the content data identifier included in the providing request received by the receiving means; and sending means for sending a result of searching by the searching means to a source of the providing request.

According to the server apparatus, delimiter information for a large number of pieces of content data is stored in the storage means. When a request for providing delimiter information is received by the receiving means, the searching means searches the storage means for delimiter information associated with target content data, and the sending means sends the delimiter information to the source of the providing request.

Accordingly, it is possible to send only delimiter information for a large number of pieces of various content data provided to the source of the request. That is, it is possible to distribute only delimiter information for content data. Furthermore, the user can obtain and use only delimiter information for target content data.

According to another embodiment of the present invention, there is provided an information distribution method that is used with a storage medium storing delimiter information for a large number of pieces of content data, the information distribution method including the steps of receiving a request for providing delimiter information, the request including a content data identifier and being transmitted via a network; searching the storage medium for delimiter information for target content data, on the basis of the content data identifier included in the providing request received; and sending a result of the searching to a source of the providing request.

According to another embodiment of the present invention, there is provided a recording medium having recorded thereon a large number of pieces of delimiter information for various content data, wherein it is possible to refer to associated delimiter information on the basis of a content data identifier.

According to the recording medium, delimiter information for a large number of pieces of content data is recorded and provided in such a manner that searching on the basis of a content data identifier is allowed. Thus, using the recording medium, it is possible to distribute only delimiter information for a large number of pieces of content data.

According to these embodiments of the present invention, when content is reconstructed or edited by a user, using delimiter information for the content, it is readily possible to reedit or reconstruct the content, and to create high-quality content in accordance with individual users' preferences or the like.

Using content delimiter information, it is possible, for example, to synchronize content delimiters with user's movement, which has not hitherto been possible. This improves the sense of synchronization with the content. Furthermore, by playing back another piece of content in synchronization with delimiter information of a certain piece of content, it is possible to reconstruct the content in an impressive manner.

Furthermore, by preparing delimiter information for music content data recorded on an existing CD, or content data provided via a network as compressed by ATRAC (Adaptive Transform Acoustic Coding), MP3 (Motion Picture Expert Group Audio Layer 3), or the like, the user can reedit or reconstruct existing music content data.

BRIEF DESCRIPTION OF THE DRAWINGS

FIG. 1 is a block diagram of recording and playback apparatus embodying a content using apparatus and a content using method according to an embodiment of the present invention;

DESCRIPTION OF THE PREFERRED EMBODIMENTS

Figure 2A:
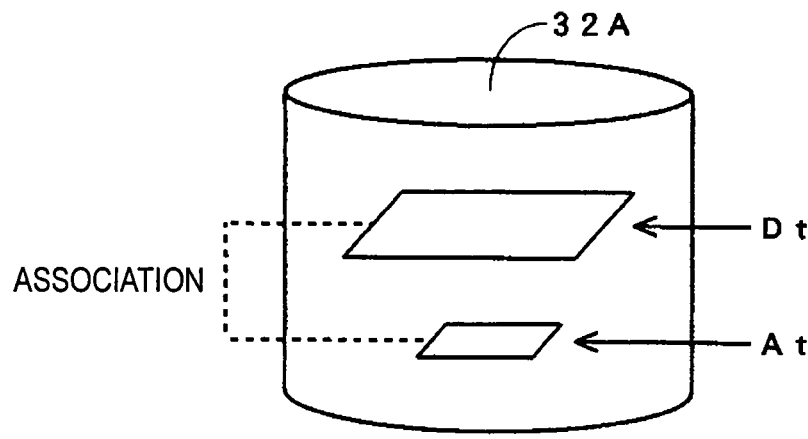
FIGS. 2A and 2B are diagrams for explaining recording media that can be used and how the recording media are used.

Now, apparatuses, methods, and recording media according to embodiments of the present invention will be described with reference to the drawings.
Recording and Playback Apparatus FIG. 1 is a block diagram of a recording and playback apparatus embodying an apparatus and method according to an embodiment of the present invention. Referring to FIG. 1, the recording and playback apparatus according to this embodiment includes a controller 10, an output unit 20, a storage unit 30, an external interface (hereinafter abbreviated as external I/F) 41, an input interface (hereinafter abbreviated as input I/F) 42, a digital interface (hereinafter abbreviated as digital I/F) 43, a wireless interface (hereinafter abbreviated as wireless I/F) 44, and a transmitting and receiving antenna 45.

The controller 10 is a microcomputer in which a central processing unit (CPU) 11, a read-only memory (ROM) 12, and a random access memory (RAM) 13 are connected to each other via a CPU bus 14. The controller 10 controls the components of the recording and playback apparatus.

The output unit 20 includes an audio decoder 21, an audio output device 22, a video decoder 23, and a video display device 24. The audio output device 22 is a speaker. The video display device 24 is a display such as a liquid crystal display (LCD), a plasma display panel (PDP), an organic electro luminescence (EL) display, or a cathode-ray tube (CRT) display.

The storage unit 30 includes an interface (hereinafter abbreviated as I/F) 31 and a recording medium 32. As the recording medium 32, various types of recording media according to embodiments of the present invention can be used, such as hard disks, optical disks, magneto-optical disks, semiconductor memories, and flexible disks.

Furthermore, as the recording medium 32, it is possible to use a plurality of recording media of the same type, such as a plurality of hard disks or a plurality of optical disks. Also, it is possible to use a plurality of recording media of different types, such as a hard disk and an optical disk, or an optical disk and a magneto-optical disk.

As will be described later, the recording medium 32 stores audio content data, video content data, or AV content data that is to be played back. The recording medium 32 also stores delimiter information that is content property information associated with respective pieces of content data and that serve as various types of delimiters of content data. The delimiter information is obtained separately from content data.

The external I/F 41 is used, in this embodiment, for connection with the Internet 100. Thus, in this embodiment, audio content data, video content data, audio and video content data, text data, or other types of data can be downloaded from the Internet 100 and stored in the recording medium 32 via the I/F 31. Also, it is possible to send information to an intended server apparatus from the recording and playback apparatus and to store the information therein.

The input I/F 42 is a key operation unit for accepting inputs through operations by a user. The operation inputs accepted via the input I/F 42 are converted into electric signals, which are supplied to the controller 10. Thus, the controller 10 can control the recording and playback apparatus according to the operation inputs by the user.

The digital I/F 43 is an interface compliant to IEEE (Institute of Electrical and Electronics Engineers) 1394, USB (Universal Serial Bus), or other standards for digital interfaces. The digital I/F 43 is connected to another electronic apparatus via a dedicated line so that data such as content data and delimiter information can be exchanged.

The wireless I/F 44 and the transmitting and receiving antenna 45 can exchange information with each other, for example, via a wireless LAN connection. Furthermore, it is possible to receive information such as content data and delimiter information from a wireless LAN system via the wireless I/F 44 and the transmitting and receiving antenna 45.

In the recording and playback apparatus according to this embodiment, in the recording medium 32 of the storage unit 30, content data is stored, and also delimiter information associated with the content data is obtained and stored. The delimiter information, which is content property information, is received from another apparatus such as a server apparatus via the Internet 100 using the external I/F 41. Furthermore, as described earlier, it is possible to send content data and delimiter information from the recording and playback apparatus to another apparatus. Also, it is possible to send and receive delimiter information, which is content property information, using the wireless I/F 44.

When playback of intended audio content stored in the recording medium 32 is instructed via the input I/F 42, the controller 10 reconstructs the content data to be played back on the basis of the instruction input by the user and the delimiter information, and supplies the content data reconstructed to the output unit 20. Accordingly, sounds and images corresponding to the content data are output for viewing and listening.

Delimiter Information for Content Data

Delimiter information is content property information for content data, and various types of delimiter information exist depending on the types of content data. For example, when the content data is music data, delimiter information for the content data represents points of change in music or musically meaningful segments, for example, as described below.

For example, regarding music that is produced by playing back the music data, the delimiter information represents points of segmentation at intervals of one bar, points of segmentation at intervals of a plurality of bars, such as two bars, three bars, four bars, and so forth, the start and end points of an introduction, points of change in melody, the start and end points of a highlight portion, the start and end points of singing or utterance, the start and end points of an interlude, the start and end points of ending, the start and end points of a chorus, the start and end points of performance of a specific musical instrument, the start and end points of each duet part, and so forth. The delimiter information may also represent the start and end points of other specific types of segments of music content.

In ordinary musical pieces, the points of change in melody are formed by parts with different melodies, such as an introduction, A melody or the first melody, B melody or the second melody, a highlight portion, and an ending.

Although the terms "start and end points" are used herein, in the case of certain continuous segments, such as bars, it is possible to use a point immediately before the start point of a next segment as the end point of a segment. That is, information representing end points does not necessary exist, and it is possible that delimiter information represents only start points.

When the content data is video data, delimiter information for the content data represents various points of change in video content or various meaningful segments of video content, as follows.

For example, the delimiter information may represent a point of video scene change, a point of video cut change, a point of appearance of an object or person of interest, a point of disappearance of an object or person of interest, the start and end points of a scene of interest such as an action scene or a car chase scene, a point of change in image quality such as brightness, color phase, or color saturation, the start and end points of fade in, the start and end points of fade out, and so forth. The delimiter information may also represent the start and end points of other types of segments of video content.

Regarding video content data, a video scene change refers to a change in the scene itself, such as a change from indoor to outdoor, while a cut change refers to a change in viewpoint (camera position) of the same scene, for example, from a front view to a side view.

Also with video content, in the case of certain continuous segments, such as bars, it is possible to use a point immediately before the start point of a next segment as the end point of a segment. That is, information representing end points does not necessary exist, and it is possible that delimiter information represents only start points.

In the case of AV content in which audio data and video data are played back in synchronization with each other, the delimiter information for audio content and the delimiter information for video content described above can be used respectively for the audio component and the video component.

The delimiter information can be represented in various forms. For example, when the content data is music content data recorded on an optical disk, the delimiter information may be represented by, for example, time information of subcodes, sector addresses or cluster addresses of the optical disk, or the number of bytes or bits from the beginning of content. When the content data is AV content data or video content data such as television data or video data, the delimiter information may be represented by time codes of content, the number of bytes or bits from the beginning of content, the number of samples, the number of GOPs (group of pictures), the number of video frames, or the number of sound frames. When the audio content data is compressed, the delimiter information may be represented by the number of compressed blocks from the beginning.

When the number of bytes, the number of bits, the number of samples, the number of GOPs, the number of video frames, the number of sound frames, or the number of compressed blocks is used, without limitation to the number or quantity as counted from the beginning, the delimiter information may be represented on the basis of the difference with respect to the immediately previous delimiter information. Alternatively, the delimiter information may be represented with reference to a predetermined position, such as the end point.

The delimiter information may be represented by a mathematical expression. For example, when the length of the first segment is represented by a value a, followed by n segments each having a length represented by a value b, and then followed by m segments each having a length represented by a value c, the delimiter information can be represented as $a+b \cdot n+c \cdot m$. In this expression, the symbol "·" represents repetition (multiplication). The delimiter information may be represented in various other forms.

As described above, various types of delimiter information exist, and various forms of representation can be used. Thus, delimiter information for a piece of content data is not necessarily limited to a single type. It is possible that a plurality of types of delimiter information exists for a single piece of content data.

When a plurality of types of delimiter information exists for a single piece of content data, for example, predetermined class information is attached so that it is possible to grasp the type and form of representation of the delimiter information. In this way, it is possible to use a plurality of types of delimiter information for a single piece of content data.

Content data and delimiter information that serves as content property information of the content data are associated with each other using an identifier such as an ISRC (International Standard Recording Code), which is attached to each individual piece of content data to allow identification of the specific piece of content data, so that it is possible to search for either the content data or the delimiter information on the basis of the identifier.

A provider of content data or an entity requested by the content provider prepares accurate delimiter information on the basis of each piece of content data, and the delimiter information is provided as recorded on a recording medium such as an optical disk, a magneto-optical disk, or a semiconductor memory, or via a network such as the Internet.

Thus, for example, even when a CD having recorded thereon a plurality of pieces of music content data is created and sold to a user, it is possible to prepare delimiter information for the music content data recorded on the CD and to provide the delimiter information separately from the content data via various recording media or networks.

Recording Medium 32

Figure 2B:
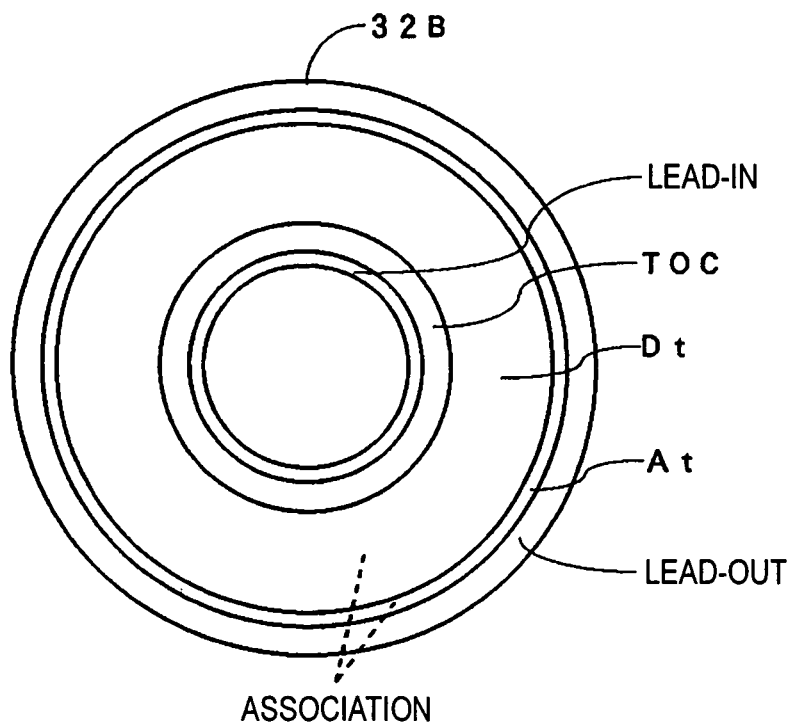
Figure 3:
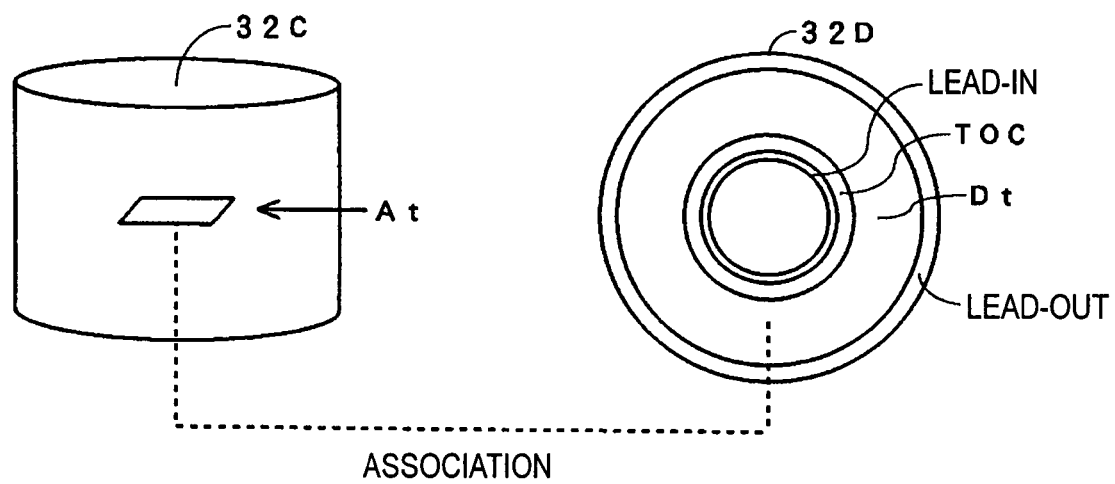
FIG. 3 is a diagram for explaining recording media that can be used and how the recording media are used.

Now, specific examples of the recording medium 32 that is used in the recording and playback apparatus according to the embodiment will be described. FIGS. 2A and 2B and FIG. 3 are diagrams for explaining specific examples of recording media that can be used in the recording and playback apparatus according to this embodiment. FIG. 2A shows a case where a hard disk (hard disk drive) 32A is used. FIG. 2B shows a case where an optical disk 32B is used. FIG. 3 shows a case where an optical disk and a hard disk (hard disk drive) are used in combination.

First, the case where the hard disk 32A is used as the recording medium 32 will be described with reference to FIG. 2A. Referring to FIG. 2A, content data Dt, such as audio content data, video content data, or AV content data, is stored in the hard disk 32A. For example, the content data Dt is copied from an optical disk for private use, or is downloaded via the Internet.

Referring to FIG. 2A, delimiter information that is content property information At for the content data stored on the hard disk 32A is recorded as a separate file in the hard disk 32A or a separate chunk in the content data Dt. As described earlier, the content data Dt and the content property information At are associated with each other using an identifier for identification of the content data. The content property information At is used when the content data Dt reconstructed for playback.

Next, the case where the optical disk 32B is used as the recording medium 32 will be described with reference to FIG. 2B. Referring to FIG. 2B, content data Dt, such as audio content data, video content data, or AV content data, is stored in a data storage area of the optical disk 32B. The optical disk 32B, in addition to a lead-in area, a TOC (table of contents) area, a content-data area, and a lead-out area that are usually provided on an optical disk, has an area for storing delimiter information, i.e., the content property information At, where delimiter information for the content data Dt is stored.

Also in this case, the content data Dt and the content property information At are associated with each other using an identifier for identification of the content data. As described earlier, the content property information At is used when the content data Dt reconstructed for playback. The optical disk 32B is sold with content data recorded thereon, or is created by recording content data downloaded via the Internet using a personal computer or the like.

Next, the case where a hard disk (hard disk drive) 32C and an optical disk 32D are used as the recording medium 32 will be described with reference to FIG. 3. Content data Dt, such as audio content data, video content data, or AV content data is recorded on the optical disk 32D. Delimiter information that is content property information At for the content data Dt recorded on the optical disk 32D is stored in the hard disk 32C.

Also in this case, the content data Dt recorded on the optical disk 32D and the content property information At stored in the hard disk 32C are associated with each other using an identifier for identification of the content data. As described earlier, the content property information At is used when the content data Dt reconstructed for playback.

As described with reference to FIGS. 2A and 2B and FIG. 3, the content data Dt and the content property information At exist independently of each other, and it is possible, for example, to obtain delimiter information later for content data the user already possesses.

Reconstruction and Playback of Content Data

As described earlier, in the recording and playback apparatus according to this embodiment, when content data recorded on the recording medium 32 thereof is to be played back, it is possible, if so instructed by the user, to reconstruct the content data to be played back on the basis of delimiter information for the content data and an instruction input via the input I/F 42, and to thereby output new content data for playback.

Figure 4:
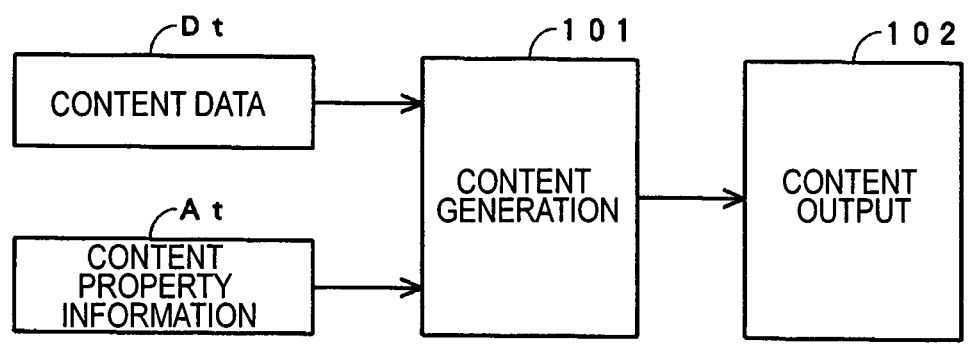
FIG. 4 is a diagram for explaining a function of reconstructing content by the recording and playback apparatus.

FIG. 4 is a diagram for explaining a function for reconstructing content by the recording and playback apparatus according to this embodiment. Referring to FIG. 4, in the recording and playback apparatus according to this embodiment, content data Dt and delimiter information that is content property information associated with the content data Dt are stored in association with each other on the recording medium 32.

When playback of an intended piece of content data stored on the recording medium 32 is instructed with a user's instruction to reconstruct the content data using delimiter information, the controller 10 reads the content data Dt to be played back from the recording medium 32 via the I/F 31, and reads delimiter information that is content property information At for the content data Dt from the recording medium 32.

Then, the controller 10 reorders segments of the content data, removes certain segments, adds information to certain segments, or otherwise processes the content data on the basis of the content property information At serving as delimiter information and the instruction input by the user, thereby generating new content data. The function of generating new content is implemented as a content generating function 101 by the controller 10.

The newly generated content data is separated into audio data and video data. The audio data is supplied to the decoder 21 of the output unit 20, and the video data is supplied to the decoder 23 of the output unit 20. The decoder 21 performs expansion and D/A (digital-to-analog) conversion on the audio data to generate audio signals for output, and supplies the audio signals to the audio output device 22. Similarly, the decoder 23 performs expansion and D/A (digital-to-analog) conversion on the video data to generate video signals for output, and supplies the video signals to the video display device 24.

Thus, the audio output device 22 produces sound corresponding to the reconstructed content data, and the video display device displays images corresponding to the reconstructed content data. In this manner, a content outputting function 102 is implemented by cooperation of the controller 10 and the output unit 20.

Distribution of Delimiter Information as Content Property Information

Figure 5:
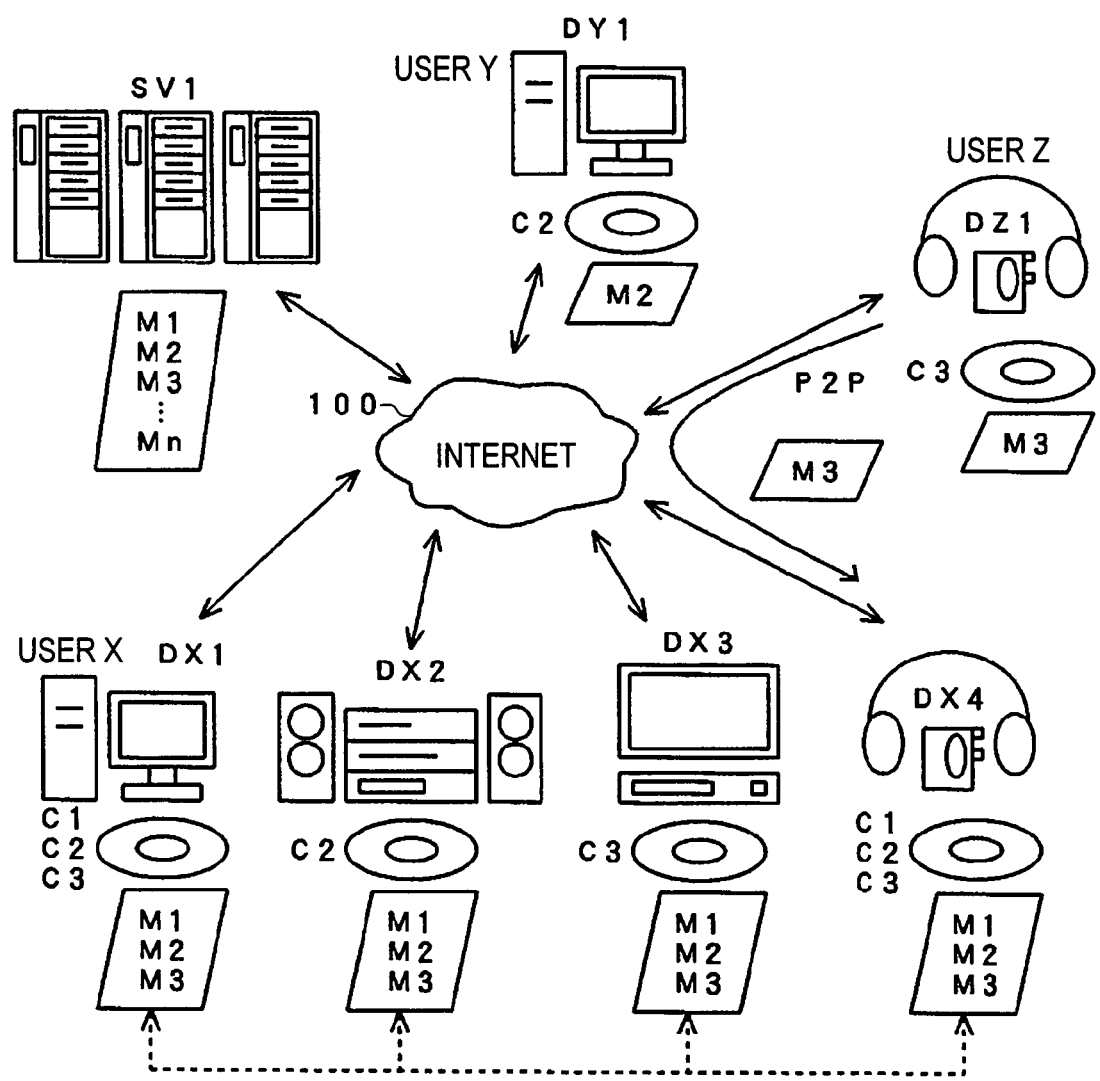
FIG. 5 is schematic diagram for explaining distribution of delimiter information as content property information.

FIG. 5 is a schematic diagram for explaining distribution of delimiter information as content property information. In FIG. 5, C1, C2, C3, ..., Cn (n is an integer) denote pieces of content data, and M1, M2, M3, ..., Mn (n is an integer) denote pieces of delimiter information as content property information.

Referring to FIG. 5, a content-property-information server SV1 distributes delimiter information. A user X has a personal computer DX1, an audio apparatus DX2, a video apparatus DX3, and a portable AV apparatus DX4. A user Y has a personal computer DY1. A user Z has a portable AV apparatus DZ1. Each of the personal computer DX1, the audio apparatus DX2, the video apparatus DX3, the portable AV apparatus DX4, the personal computer DY1, and the portable AV apparatus DZ1 is implemented by the recording and playback apparatus according to this embodiment.

The content-property-information server SV1 stores the delimiter information M1, M2, M3, ..., Mn as content property information for various content data C1, C2, C3, ..., Cn. The personal computer DX1 has the content data C1, C2, and C3. The audio apparatus DX2 has the content data C2. The video apparatus DX3 has the content data C3. The portable AV apparatus DX4 has the content data C1, C2, and C3. The personal DY1 of the user Y has the content data C2. The portable AV apparatus DZ1 of the user Z has the content data C3.

Each of the personal computer DX1, the audio apparatus DX2, the video apparatus DX3, the portable AV apparatus DX4, the personal computer DY1, and the portable AV apparatus DZ1 sends a request for providing delimiter information that is content property information including an identifier for the content data it has to the content-property-information server SV1 via the Internet 100.

Upon receiving the request for delimiter information, the content-property-information server SV1 searches for the relevant delimiter information on the basis of the content identifier included in the request, and returns the delimiter information found by the search to the source recording and playback apparatus in association with the identifier. Upon receiving the delimiter information returned from the content-property-information server SV1, the recording and playback apparatus (user apparatus) records the delimiter information on the recording medium 32 thereof in association with the content data it has.

Thus, when playing back content data it has, each recording and playback apparatus can reconstruct the content data using associated delimiter information and play back the content data reconstructed.

As well as the content-property-information server SV1, the delimiter information M1, M2, ..., Mn can be received by peer to peer from recording and playback apparatuses of other users. For example, referring to FIG. 5, the portable AV apparatus DX4 of the user X can send a request for delimiter information of the content data C3 (request for delimiter information including the identifier of the content data C3) via the Internet 100 to the portable AV apparatus DZ1 of the user Z to receive the delimiter information M3 of the content data C3 from the portable AV apparatus DZ1 of the user Z.

Delimiter information as content property information can be shared within a specific community or among friends by the method described above. That is, it is possible to share delimiter information as content property information among acquaintances.

Furthermore, it is possible to share content property information among a plurality of recording and playback apparatuses of a user. For example, referring to FIG. 5, the user X has the personal computer DX1, the audio apparatus DX2, the video apparatus DX3, and the AV apparatus DX4. The user X can share delimiter information as content property information among these recording and playback apparatuses DX1, DX2, DX3, and DX4 as indicated by dotted lines in FIG. 5, for example, by connecting the recording and playback apparatuses using digital interfaces via a LAN or directly.

When a user shares certain content among a plurality of recording and playback apparatuses, the user need not request the content-property-information server SV1 send associated delimiter information more than once. Furthermore, it is possible to implement a system in which delimiter information as content property information is managed unitarily by, for example, by the personal computer DX1 so that each recording and playback apparatus can request and obtain the delimiter information when needed.

Furthermore, each user can prepare delimiter information for various content data, send the delimiter information to the content-property-information server SV1 and store the delimiter information therein, and make the delimiter information available to a large number of users, or provide the delimiter information to friends by peer to peer. In this case, the delimiter information is unprovided (undistributed) delimiter information, and various types of delimiter information can be used, such as delimiter information for parts of performance of a specific musical instrument or delimiter information for parts of a characteristic melody.

Construction of Content-Property-Information Server

Figure 6:
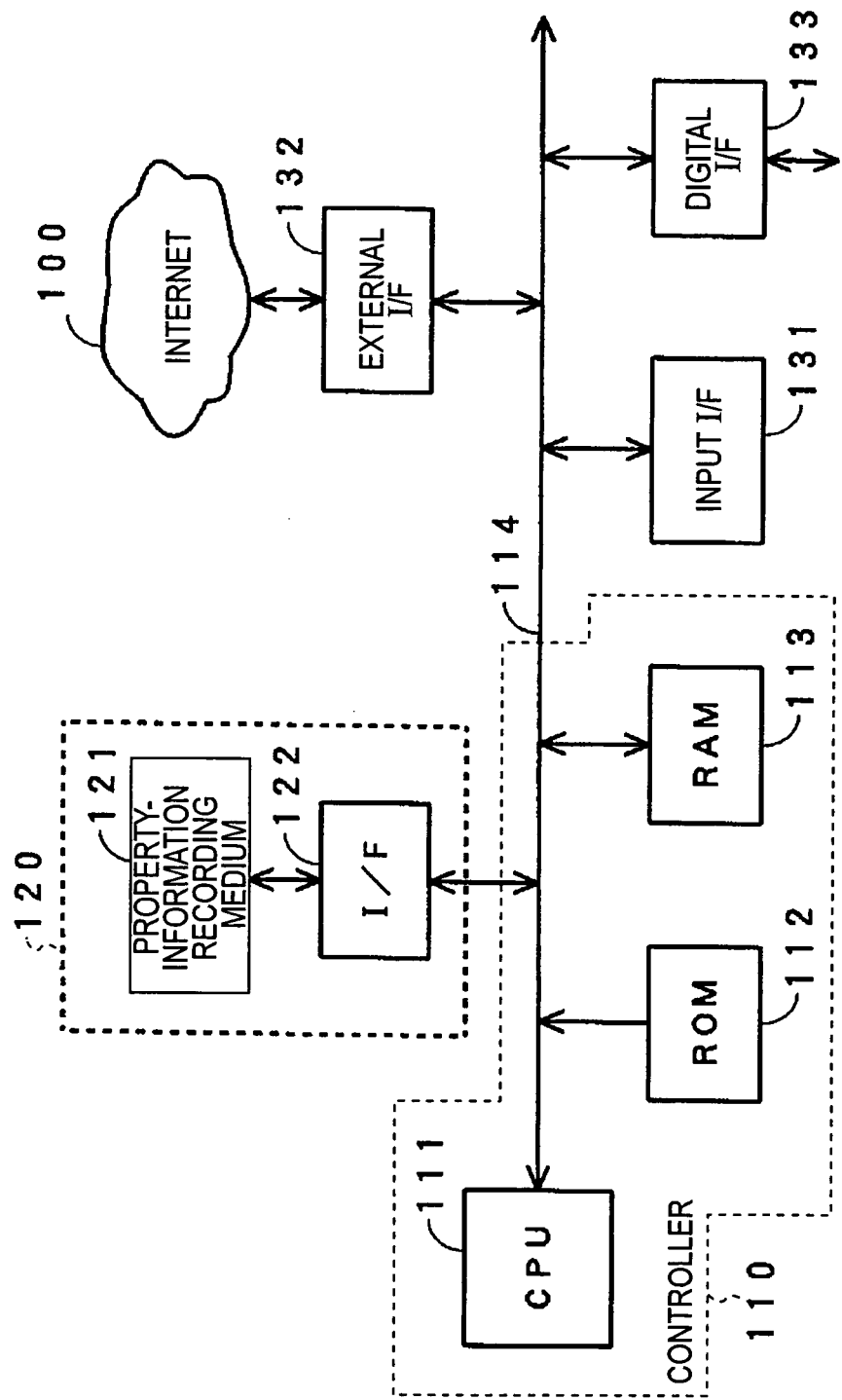
FIG. 6 is a block diagram of a content-property-information server embodying a distribution server apparatus and an information distribution method according to an embodiment of the present invention.

The content-property-information server SV1 is, for example, as shown in FIG. 6, a computer having an I/F 122 and a large-capacity property-information recording medium 121 such as a hard disk, so that delimiter information as content property information can be stored. The content-property-information server includes a controller 110 including a CPU 111, a ROM 112, and a RAM 113, an input I/F 131 for accepting inputs through operations by the user, and external I/F (communication I/F) for connection with the Internet, and a digital I/F 133 for connection with another apparatus. The content-property-information server SV1 is constructed the same as the recording and playback apparatus shown in FIG. 1, except in that the output unit 20, the wireless I/F 44, and the transmission antenna are not provided.

The external I/F 132 implements the function of receiving means for receiving a request for providing delimiter information, and the function of sending means for sending delimiter information. The controller 110, the I/F 122, and the recording medium cooperate to implement the function of searching means for searching for delimiter information.

Processes of Obtaining and Providing Content Property Information

Next, a process in which a recording and playback apparatus of a user (referred to as a user apparatus herein) DX1, DX2, DX3, DX4, DY1, or DZ1 obtains delimiter information as content property information from the content-property-information server SV1 (referred to as a server apparatus herein), and a process in which the server SV1 provides delimiter information in response to a request from the user apparatus DX1, DX2, DX3, DX4, DY1, or DZ1, will be described with reference to a flowchart shown in FIG. 7.

The description will be given in the context of an example where a user apparatus receives delimiter information from a server apparatus. However, the processes are substantially the same in cases where delimiter information is exchanged between user apparatuses of different users or delimiter information is exchanged between user apparatuses of the same user. That is, a user apparatus that requests delimiter information be provided executes substantially the same process as the user apparatus, and an apparatus that provides delimiter information executes substantially the same process as the content-property-information server SV.

Figure 7:
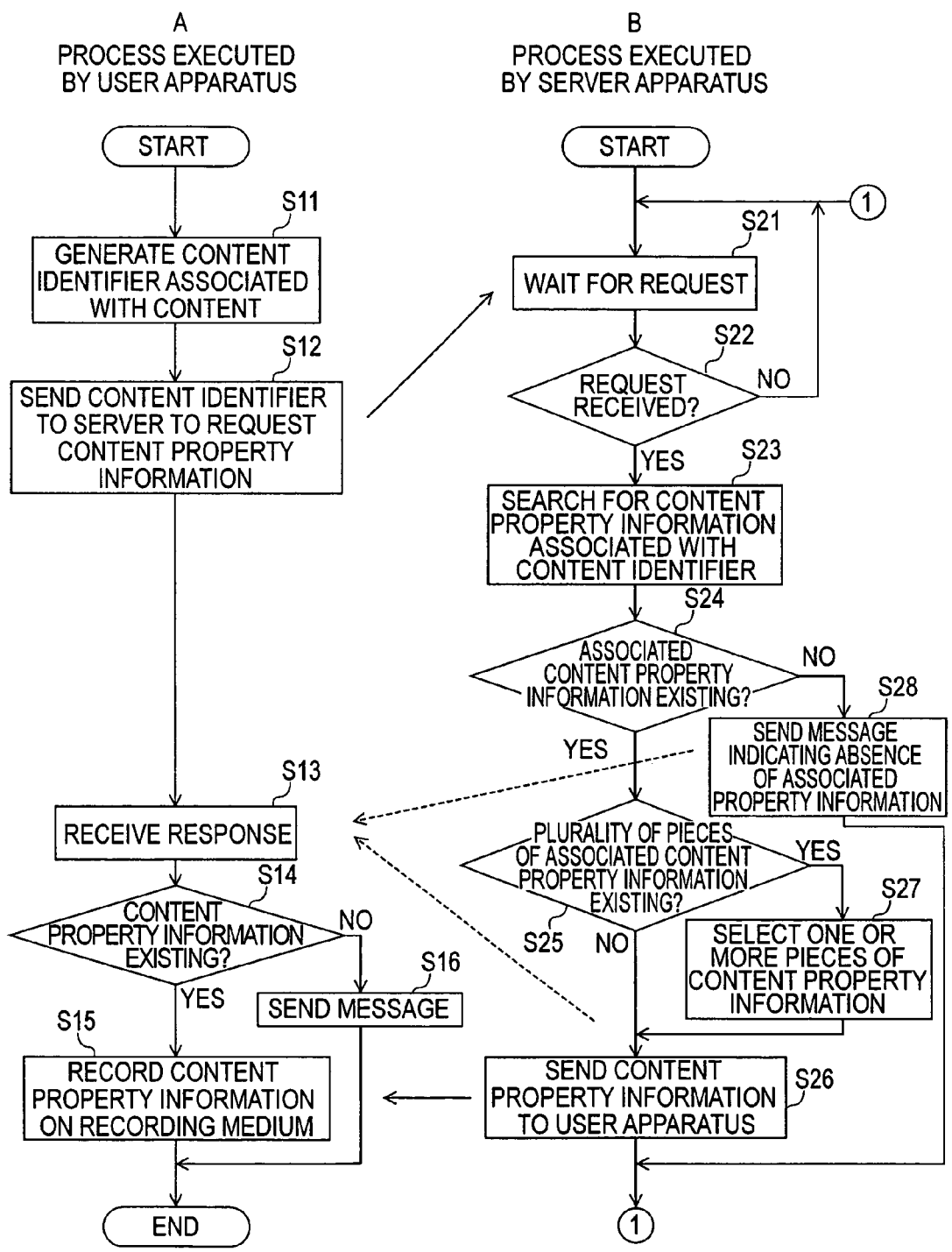
FIG. 7 is a flowchart of a process of obtaining content property information and a process of providing content property information.

In FIG. 7, part A shows a process executed by a user apparatus that requests that delimiter information be provided, and part B shows a process executed by a server apparatus that provides delimiter information. In step S11, when a predetermined operation is performed for requesting that delimiter information be provided, the controller 10 of the user apparatus generates an identifier for target content data.

The type of the identifier is not particularly limited as long as the identifier allows identification of an individual piece of content data. For example, when the target content data is recorded on a disk recording medium, the identifier can be generated uniquely from the total number of tracks used for recording the content data or from playback time, or from the entirety or a part of the content data. For example, the number of tracks used for recording differs depending on the amount of content data recorded, and playback time differs depending on content data. Thus, it is possible to generate a unique identifier from these pieces of information, or in combination with information such as ISRC.

Alternatively, the entirety or a part of the content data may be used as an identifier, or an identifier may be generated by predetermined processing using the entirety or a part of content data, for example, by applying a predetermined expression to the content data to obtain a value. Yet alternatively, an existing identifier that is recorded in advance in association with content may be used as an identifier. In this example, an existing identifier is used.

Then, in step S12, the controller 10 of the user apparatus generates a request that delimiter information including the identifier obtained in step S11 be generated, and sends the request to the server apparatus via the external I/F 41 and the Internet 100.

The controller 110 of the server apparatus is constantly executing the process shown in part B of FIG. 7. In step S21, the controller 110 monitors whether a request for providing delimiter information arrives from the user apparatus via the Internet 100 and the external I/F 132 thereof. In step S22, the controller 110 checks whether a providing request has been received. When it is determined in step S22 that no request for providing delimiter information has been received, the process returns to step S21 to wait for arrival of a request for providing delimiter information.

When it is determined in step S22 that a request for providing delimiter information has been received by the controller 110 of the server apparatus from the user apparatus, the process proceeds to step S23, in which the controller 110 of the server apparatus searches for delimiter information associated with target content data from delimiter information stored on the recording medium 121 thereof, on the basis of the content data identifier included in the request received.

Then, in step S24, the controller 110 of the server apparatus checks whether delimiter information for the target content data exists. When it is determined that such delimiter information exists, the process proceeds to step S25, in which the controller 110 checks whether a plurality of pieces of delimiter information for the target content exists. When it is determined in step S25 that only a single piece of delimiter information exists for the target content data, the process proceeds to step S26, in which the controller 110 returns the delimiter information to the user apparatus at the source of the request via the external I/F 132 and the Internet 100. The process then returns to step S21, and subsequent steps are repeated.

When it is determined in step S25 that a plurality of delimiter information exists for the target content data, the process proceeds to step S27, in which the controller 110 of the server apparatus selects one or more pieces of delimiter information. Then, in step S26, the controller 110 sends the delimiter information selected to the user apparatus at the source of the request via the external I/F 132 and the Internet 100. The process then returns to step S21, and subsequent steps are repeated.

Regarding selection of delimiter information in step S27, various methods can be used. For example, the user of the user apparatus and an administrator of the server apparatus may make an advance agreement on the number of pieces of delimiter information to be provided. Alternatively, the number of pieces of delimiter information requested may be specified by the user apparatus so that the specified number of delimiter information will be selected. Furthermore, a type of delimiter information requested may be specified by the user apparatus so that the specified type of delimiter information will be selected. When the number of pieces of the type of delimiter information is specified by the user apparatus, a step of accepting such information at the user apparatus is provided, and the information accepted is sent to the server apparatus as included in a providing request.

When it is determined in step S24 that delimiter information for the target content data does not exist, the process proceeds to step S28, in which the controller 110 of the server apparatus generates a message indicating the absence of delimiter information and returns the message to the user apparatus at the source of the request via the external I/F 132 and the Internet 100. The process then returns to step S21, and subsequent steps are repeated.

In step S13, the user apparatus at the source of the request receives the response from the server apparatus via the external I/F 41. Then, in step S14, the user apparatus checks whether the requested delimiter information has been transmitted on the basis of the response received. When it is determined that the requested delimiter information has been received, the process proceeds to step S15, in which the delimiter information received is recorded on the recording medium 32 in association with the content data. The process shown in part A of FIG. 7 is then exited.

When it is determined in step S14 that the requested delimiter information has not been received (i.e., a message indicating the absence of relevant delimiter information has been received), the process proceeds to step S16, in which the controller 10 of the user apparatus notifies the user that intended delimiter information does not exist, using a display element thereof such as an LCD (liquid crystal display), a light emitting element thereof such as an LED (light emitting diode) (not shown in FIG. 1), a buzzer, or an alarm. The process shown in part A of FIG. 7 is then exited.

As described above, the user apparatus can independently obtain only delimiter information that is content property information for content data possessed by the user apparatus, and store the delimiter information in the recording medium of the user apparatus. That is, delimiter information can be distributed alone, and the delimiter information can be obtained for use.

Figure 8:
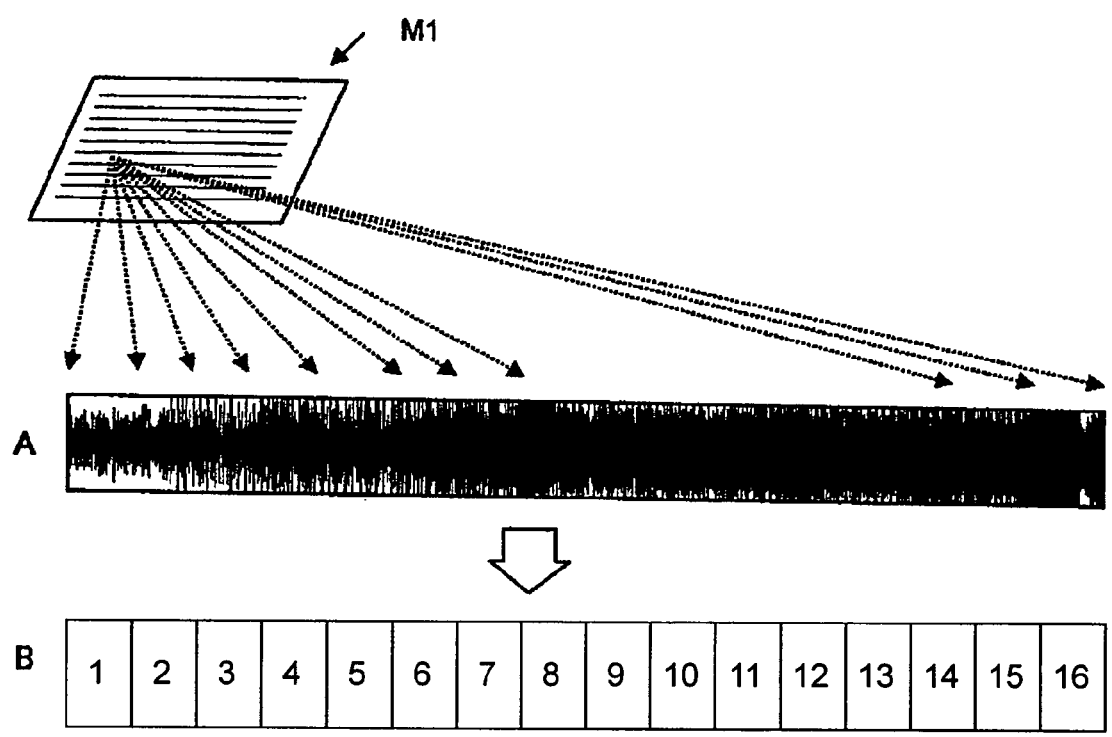
FIG. 8 is a diagram for explaining an example where content data is music content data and delimiter information thereof is bar-delimiter information.

FIG. 8 is a diagram for explaining a case where the content data is music content data and delimiter information thereof represents bars. When bar-delimiter information representing bar-delimiter positions is delimiter information M1, as described earlier, in the case of music content data recorded on an optical disk, the delimiter information is represented, for example, by time information of subcodes, sector addresses or cluster addresses of the optical disk, the number of bytes or bits from the beginning, the number of samples, or the number of compressed blocks from the beginning when the music content data is compressed.

When the number of bytes, the number of bits, the number of samples, or the number of compressed blocks is used, without limitation to the number as counted from the beginning, the delimiter information may be represented by a difference relative to immediately previous delimiter information, or with reference to a predetermined position, for example, the end position.

When the music content data shown in part A of FIG. 8 is segmented using the delimiter information, the music content data is divided on a bar-by-bar basis as shown in part B of FIG. 8. Thus, it is possible to specify each individual bar and to handle the bar as independent data.

Figure 9:
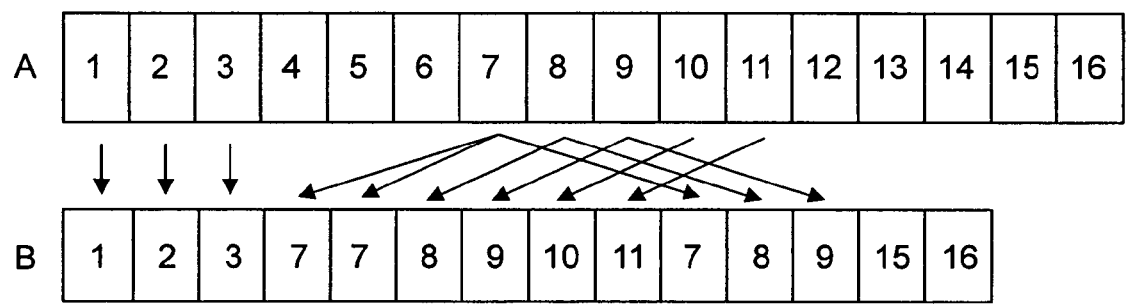
FIG. 9 is a diagram for explaining an example where music content data is reconstructed using bar-delimiter position information.

FIG. 9 is a diagram for explaining an example where music content data is reconstructed using the bar-delimiter information shown in FIG. 8. Since the music content data of each bar can be used independently on the basis of the bar-delimiter information, it is possible to divide the original content data shown in part A of FIG. 9 on a bar-by-bar basis on the basis of the delimiter information M1, and to reorder the bars for playback as shown in part B of FIG. 9, thereby reconstructing the music content data.

For example, as shown in part B of FIG. 9, when the user likes the bar 7 (the seventh bar of the original content data), it is readily possible to repeatedly listen to the bar 7. In this case, the user of the user apparatus can reconstruct audio content data so that the order of bars is rearranged and playback the reconstructed audio content data simply by specifying a new order of bars.

Information for the reordering of bars, i.e., information for reconstruction, can be input by the user to the recording and playback apparatus of the user and recorded on the recording medium 32. Alternatively, the information may be input in advance and recorded on the recording medium 32. In the case of the example shown in FIG. 9, the information for reconstruction, i.e., the information for reordering bars, is information specifying a new order of bars 1, 2, 3, 7, 7, 8, ... using the bar numbers representing the order of bars in the original content. In this case, for example, the bar 3 and the bar 7 are not continuous in the original content data, so a small noise can occur. In such as case, a very short period at the end of the bar 3 and a very short period of the bar 7 are muted so that these bars are heard as naturally continuous content.

Although the description has been given in the context of an example where the delimiter information is bar-delimiter information, as described earlier, delimiter information on the basis of a plurality of bars, or delimiter information on the basis of component parts of music content data, such as an introduction, the first chorus, a highlight portion, an interlude, the second chorus, and a highlight portion, may be used, so that it is readily possible, for example, to repeat a highlight portion or to repeat the introduction.

Furthermore, it is possible to join only highlight portions of a plurality of pieces of content data to form a single piece of music content data and to playback the piece of music content data. In this case, music content data and delimiter information of highlight portions are used as information for reconstruction. More specifically, the identifier of the first piece and delimiter information for a highlight portion of the first piece, the identifier of the second piece and delimiter information for a highlight portion of the second piece, and the identifier of the third piece and delimiter information for a highlight portion of the third piece, and so forth, are used for joining highlight portions for reconstruction.

Also in the case of video content or AV content, by using delimiter information, it is readily possible to repeatedly play back a desired portion of video data or to reorder the content for playback. Furthermore, it is readily possible to create content in which only specific portions of a plurality of pieces of video content or AV content are joined, such as digests.

Other Examples of Use of Delimiter Information

First Other Example of Use

When the mode of playback of content data is changed in synchronization with user's actions, the user feels a stronger sense of synchronization with the content played back. With the improved sense of synchronization, the sense of comfort, excitement, and entertainment of the content played back is improved. Particularly, when the user moves his/her body in synchronization with the rhythm, the user feels a good sense of synchronization when the delimiters of the music are synchronized with the rhythm.

Thus, in a recording and playback apparatus proposed below, the movement of the user is detected using a sensor, and the output of the sensor is used as information for reconstructing content data together with delimiter information, so that the sense of synchronization given by the music content is increased.

Figure 10:
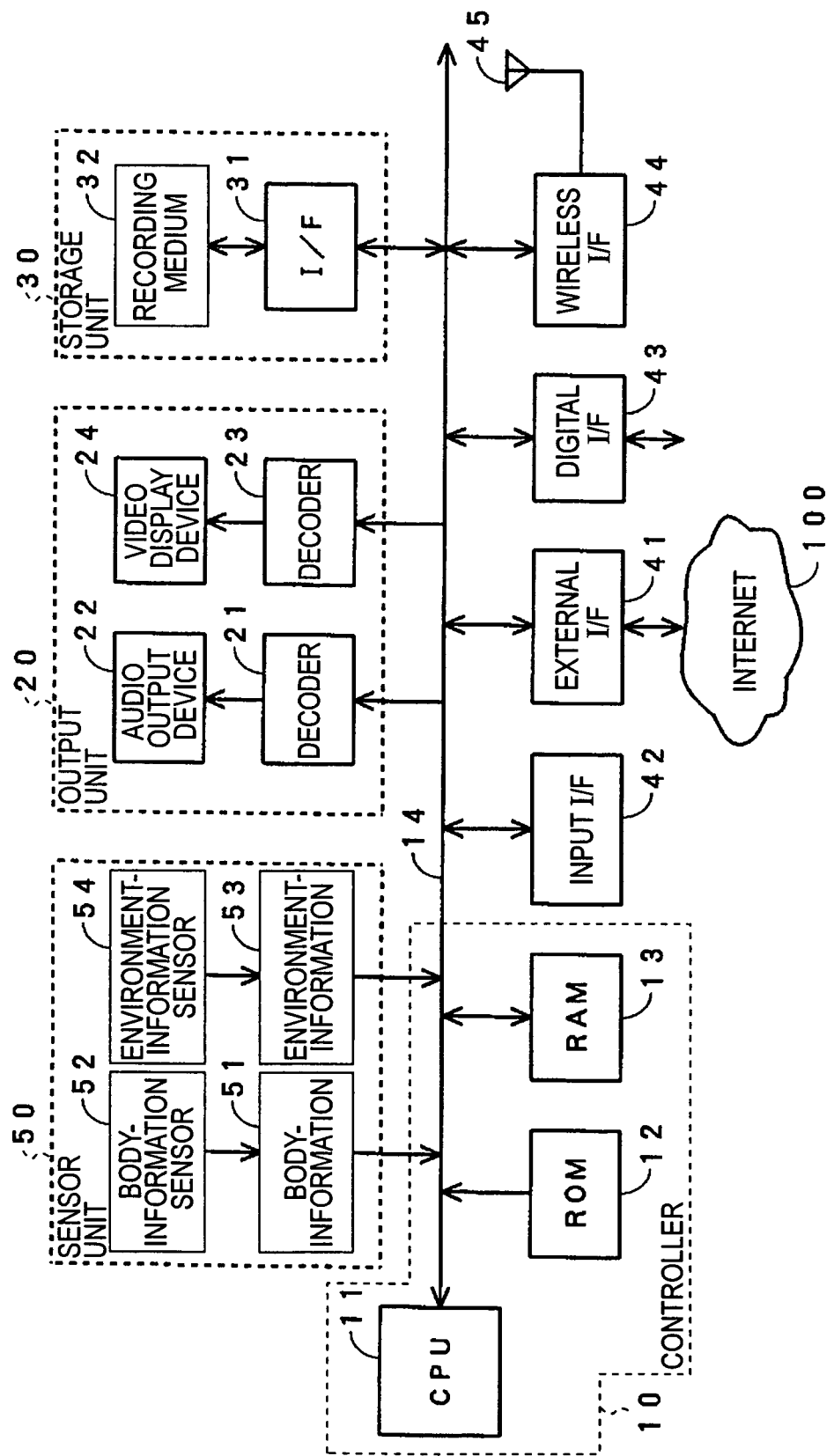
FIG. 10 is a block diagram of a recording and playback apparatus including a sensor for detecting movement of a user.

FIG. 10 is a block diagram of a recording and playback apparatus according to an embodiment of the present invention, including a sensor for detecting movement of a user. The recording and playback apparatus according to this embodiment is constructed the same as the recording and playback apparatus shown in FIG. 1, except in that it includes a sensor unit 50. Thus, parts of the recording and playback apparatus shown in FIG. 10 that are constructed the same as corresponding parts of the recording and playback apparatus shown in FIG. 1 are designated by the same numerals, and descriptions thereof will be omitted.

Referring to FIG. 10, the sensor unit 50 includes a body-information decoder 51, a body-information sensor 52, an environment-information decoder 53, and an environment-information sensor 54. The body-information sensor 52 is, for example, an acceleration sensor, a step sensor (vibration sensor), or a direction sensor, which is attached to the body of the user so that movement of the user can be detected and captured in the form of electric signals. Alternatively, the body-information sensor 52 may be, for example, a video camera that captures images of the user. This allows detecting movement of the user by analyzing the video data captured by the video camera.

The movement of the user refers to movement of a user of the recording and playback apparatus according to this embodiment, such as lateral movement of the head, movement of hands, vertical, lateral, or forward-backward movement of the trunk, movement of the legs, hand clapping, or steps of walking. Furthermore, instructions input by the user using buttons or a keyboard, a special interface of a percussion instrument, or the like, can be used as information representing movement of the user.

The body-information encoder 51 converts detection data fed from the body-information sensor 52 into data in a format for providing the data to the controller 10. That is, the body-information encoder 51 acts as an interface between the body-information sensor 52 and the controller 10 of the recording and playback apparatus.

The environment-information sensor 54 is, for example, a temperature sensor, a humidity sensor, a wind-force sensor, or a brightness sensor, which detects information regarding an environment of the user and provides the information in the form of electric signals. The environment-information decoder 53 converts detection data fed from the environment-information sensor 54 into data in a format for providing the data to the controller 10. The environment-information decoder 53 acts as an interface between the environment-information sensor 54 and the controller 10 of the recording and playback apparatus.

Then, sensor signals obtained by the body-information sensor 52 and the environment-information sensor 54 are input to the controller 10 of the recording and playback apparatus via the body-information encoder 51 and the body-information sensor 52. The controller 10 reconstructs content data that is to be playback, using the sensor signals fed from the sensor unit 50 and in consideration of delimiter information for the content data, and plays back the content data reconstructed.

Figure 11:
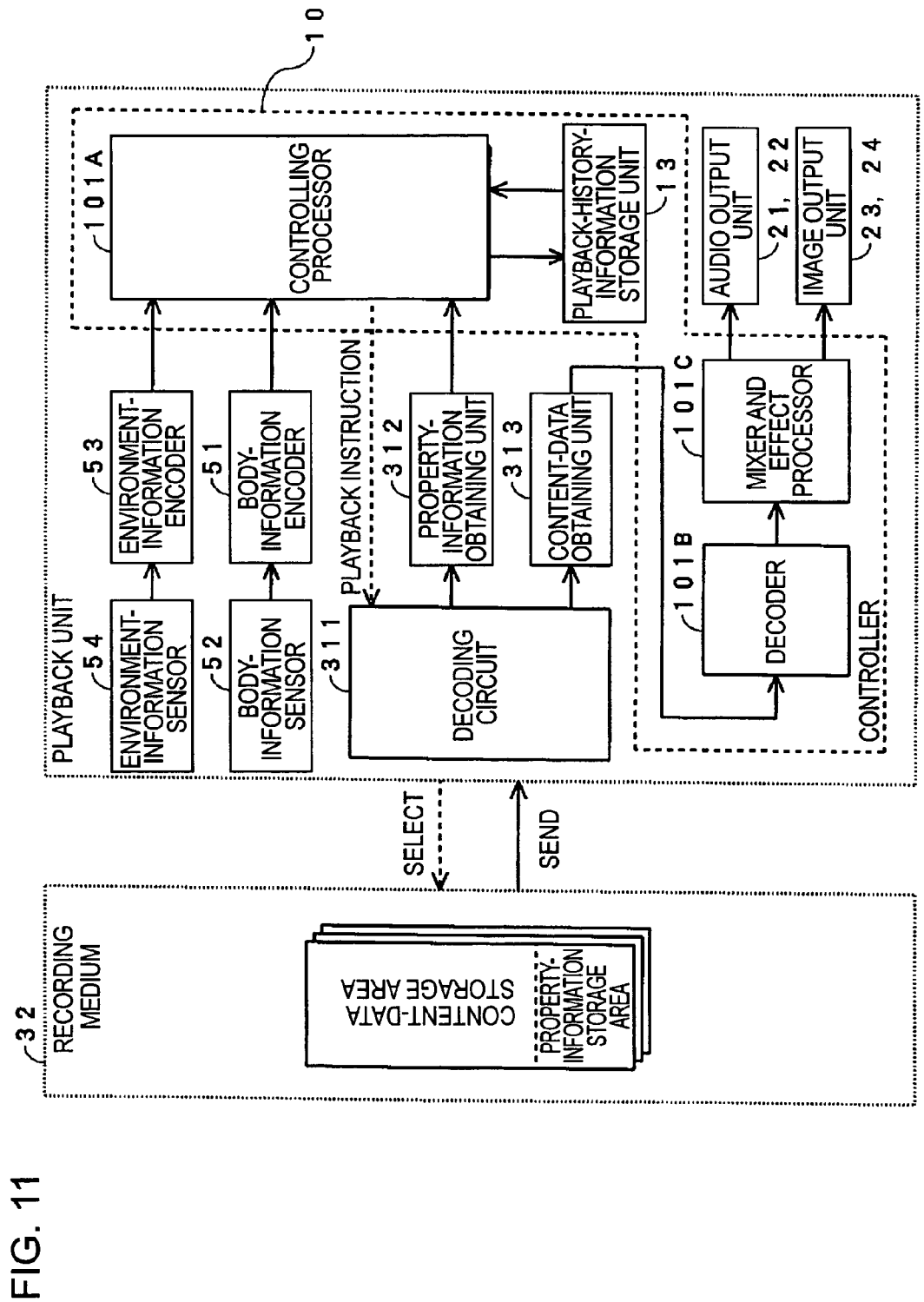
FIG. 11 is a block diagram for explaining in detail the recording and playback apparatus shown in FIG. 10.

FIG. 11 is a block diagram for describing in detail the recording and playback apparatus according to this embodiment. In the recording and playback apparatus according to this embodiment, parts other than the recording medium 32 and the external I/F 41, the input I/F 42, the digital I/F 43, and the wireless I/F 44 function as a playback unit.

The recording medium 32 includes a content-data storage area and a property-information storage area. As described earlier, on the recording medium 32, content data and property information thereof are stored in association with each other. The controller 10 functions as a controlling processor 101A, a decoder 101B for decoding content data, and a mixer and effect processor 101C. Furthermore, in this embodiment, the RAM 13 functions as a playback-history-information storage unit.

The sensor signal obtained by the body-information sensor 52 is fed to the controlling processor 101A of the controller 10 via the body-information encoder 51 as a body-information obtaining unit. The sensor signal obtained by the environment-information sensor 54 is fed to the controlling processor 101A of the controller 10 via the environment-information encoder 53 as an environment-information obtaining unit.

Content data according to the playback instruction accepted via the input I/F 42 is read according to the playback instruction from the controlling processor 101A of the controller 10 via the I/F 31 that functions as a decoding circuit 311, a property-information obtaining unit 312, and a content-data obtaining unit 313. Delimiter information, which is content-property information, is fed to the controlling processor 101A of the controller 10. The content data is fed to the decoder 101B of the controller 10.

Then, the controlling processor 101A of the controller 10 generates a control signal for reconstructing content data that is to be played back, using the sensor signal fed from the body-information sensor 52, the sensor signal fed from the environment-information sensor 54, and the delimiter information for the content data, read from the recording medium 32, and supplies the control signal to the mixer and effect processor 101C.

The content data to be played back is expanded or otherwise processed in the decoder 101B, and the resulting data is fed to the mixer and effect processor 10C. The decoded data is processed on the basis of the control signal fed from the controlling processor 101A. For example, segments such as bars are reordered in accordance with delimiters according to the delimiter information, or the tempo of playback is adjusted in accordance with the sensor signals in synchronization with delimiters according to the delimiter information. That is, the mixer and effect processor 101C functions as a unit for executing reconstruction of content data.

Audio signals fed from the mixer and effect processor 101C are fed to the audio output unit 21 and 22 to produce playback sound. Video signals fed from the mixer and effect processor 101C are fed to the video output unit 23 and 24 to produce playback image.

With the recording and playback apparatus according to this embodiment, constructed as described with reference to FIGS. 10 and 11, it is possible to reconstruct content data in consideration of user's movement and delimiter information and to play back the content data reconstructed.

Figure 12:
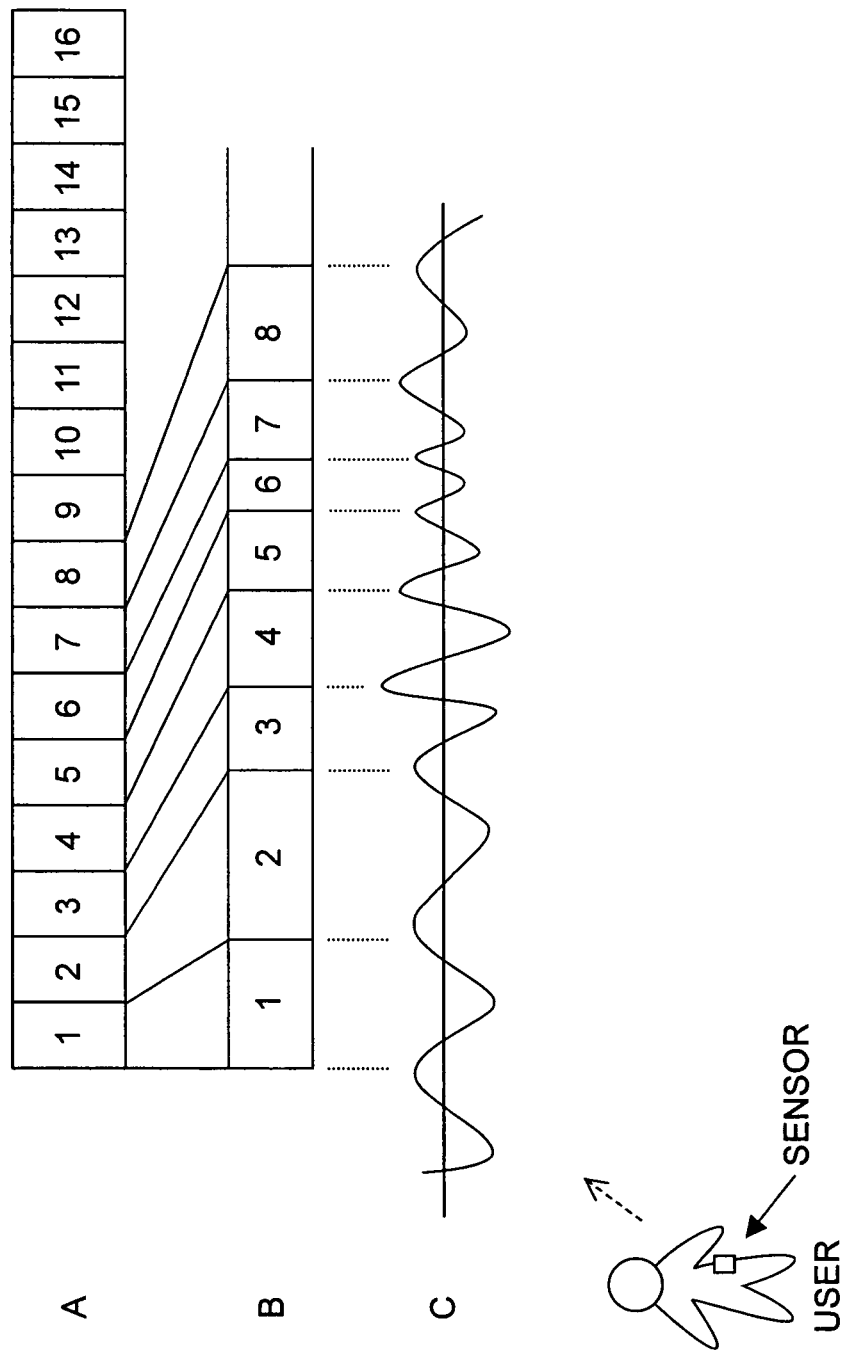
FIG. 12 is a diagram for explaining a specific example where music content having bar-delimiter information as delimiter information is reconstructed for playback using the recording and playback apparatus shown in FIG. 10.

FIG. 12 is a diagram for explaining a specific case where music content having bar-delimiter-position information as delimiter information is reconstructed using the recording and playback apparatus according to this embodiment. Part A of FIG. 12 shows music content having bar-delimiter-position information as delimiter information. Part C of FIG. 12 shows a sensor signal representing the result of real-time detection by the body-information sensor 52, i.e., the waveform of a sensor signal representing movement of the user.

In this case, the user first moves slowly, then gradually faster, and then slowly again. Thus, in synchronization with such movement, the tempo of the bars of the music content data to be played back is varied as shown in part B of FIG. 12.

Thus, for example, when the user moves his/her body in synchronization with the rhythm of the music, the rhythm of the user's movement synchronizes with the delimiters of the music content, so that the user feels a good sense of synchronization. Accordingly, with the increased sense of synchronization for the user, the content played back provides improved comfort, excitement, and entertainment.

As described above, with the recording and playback apparatus according to this embodiment, it is possible to play back content data with timing of user's movement synchronized with delimiter positions on the basis of delimiter information for the content data. For the purpose of synchronization with the user's movement, content is reconstructed in real time in consideration of sensor signals. The bars of the music data are expanded in accordance with the user's movement. By predicting the timing of a next move of the user, smoother playback can be achieved.

The prediction is possible by various methods. For example, sensor signals from the body-information sensor 52 are monitored from before playing back content data so that past information is considered for prediction. As another example, periodicity of the user's movement is detected so that the user's movement can be predicted on the basis of the periodicity.

The order of content may be the original order of content or may be changed on the basis of sensor signals. When the order is changed on the basis of sensor signals, for example, it is possible to select a bar of a large acoustic volume for a large movement and select a part with a high tempo when the movement changes rapidly.

Instead of body information, it is possible to sense environment information so that content delimiters can be synchronized with change in environmental factors, such as brightness of light, wind force, or temperature.

Since content is reconstructed in real time according to sensor signals, basically, content that is generated differs each time. However, by storing playback history in the playback-history storage unit 13 shown in FIG. 11, it is possible to playback content reconstructed in the same way according to a user's request.

Second Other Example of Use

Figure 13:
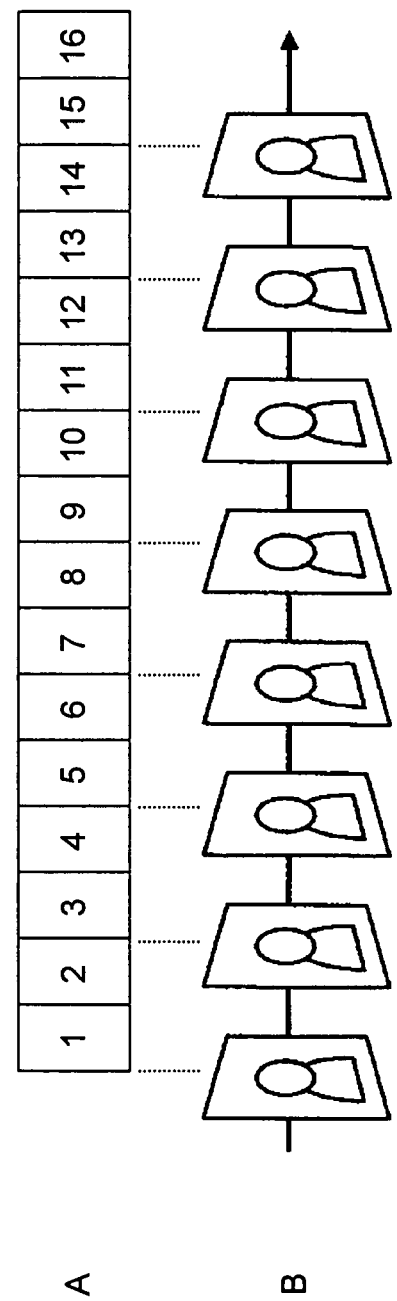
FIG. 13 is a diagram for explaining another example of use of delimiter information (another example of reconstruction of content data)

FIG. 13 shows another example of use of delimiter information (another example of reconstruction of content data). When delimiters of music are synchronized with delimiters of images, the user feels a sense of synchronization, and is more strongly impressed by the content.

In this example, in synchronization with delimiter information of music content data C1, another piece of still image content is displayed so that a slide show is automatically created. By displaying the image in synchronization with the delimiters of the music, the slide show exhibits a stronger sense of synchronization.

In the example shown in FIG. 13, a single image is arbitrarily selected from an image set G1 for each set of two bars, and the image selected is displayed. Instead of still images, moving images may be used for a slide show. As well as starting display of a moving image in synchronization with a delimiter, the display of moving image may be stopped in synchronization with a delimiter. By synchronizing the end of sound and the end of image, the impression of the content is improved.

Process of Reconstructing Content

Figure 14:
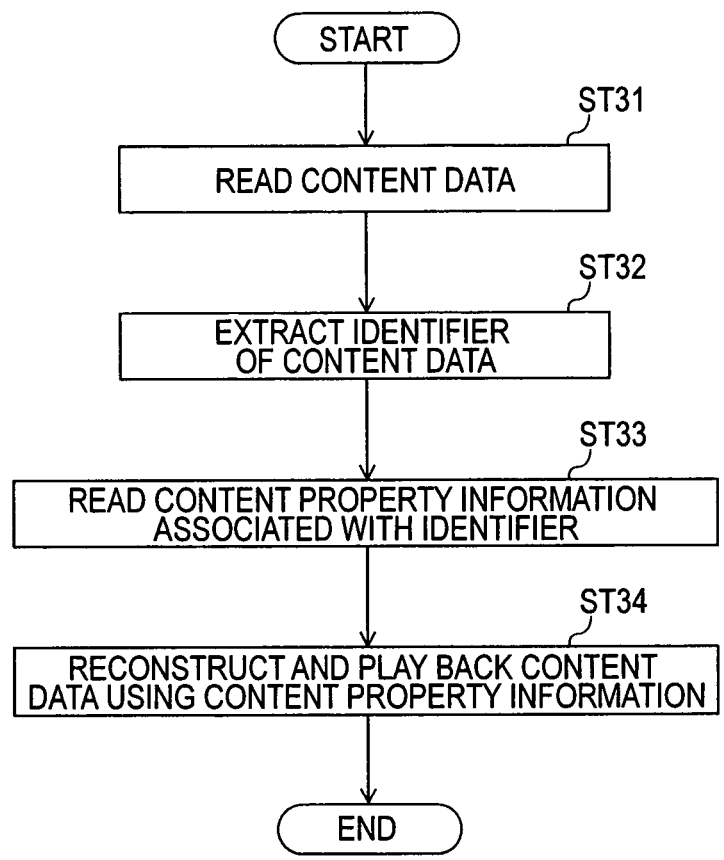
FIG. 14 is a flowchart of a process of reconstructing content data.

FIG. 14 is a flowchart of a process of reconstructing content data by the recording and playback apparatus shown in FIG. 1 or the recording and playback apparatus shown in FIGS. 10 and 11. The process shown in FIG. 14 is executed by the controller 10 when a user's instruction for playing back content data is received via the input I/F 42.

When a playback instruction is received, in step S31, the controller 10 reads content data that is to be played back according to the instruction from the recording medium 32 via the I/F 31. Then, in step S32, the controller 10 extracts an identifier of the content data that is to be played back. In this example, the identifier is an existing piece of information that is assigned in advance to each piece of content data.

Then, in step S33, on the basis of the identifier extracted in step S32, the controller 10 reads delimiter information that is content property information associated with the content data. Then, in step S34, the controller 10 reconstructs and plays back the content data on the basis of the delimiter information that has been read, and reconstruction information instructed by the user, for example, indicating the order of bars, or results of detection by a body-information sensor or an environmental-information sensor.

By distributing delimiter information of content data separately from content data as described above, it is possible to reconstruct music content data, video content data, or AV content data provided on CDs or via the Internet, and to play back existing content data as if the content data is entirely new content data.

Furthermore, the user can instruct reconstruction for playing back content data without complex operations or the like, just like selecting content data that is to be played back.

Furthermore, by preparing a recording medium having recorded thereon delimiter information that is content property information stored in the content-property-information server SV1 so that the delimiter information can be read on the basis of an identifier of associated content data, it is possible to distribute the delimiter information separately from the content data by distributing the delimiter information on the recording medium.

As described earlier, delimiter information for content data may be represented in various forms, such as an hour-minute-second timestamp, the number of bytes from the beginning of content, the number of samples, cluster addresses or sector addresses on a disk, or a difference relative to a previous delimiter. Thus, delimiter information can be represented in suitable forms depending on, for example, the providing route, such as a recording medium having recorded content data thereon.

Furthermore, although delimiter information as content property information is transmitted via the Internet, an input/output interface of a recording and playback apparatus, or distribution of a recording medium, and the delimiter information is recorded in association with content data in the recording and playback apparatus in this embodiment, delimiter information may be handled in different manners. For example, content data may be analyzed in a user apparatus to automatically generate delimiter information, or delimiter information may be input by the user.

When the content data is music content data, the music content data may be either compressed or uncompressed.

As for recording media for recording content data and delimiter information thereon, various types of recording media can be used, such as optical disks, magneto-optical disks, magnetic tapes, hard disks, semiconductor flash memories, or servers on networks.

As for optical disks and magnetic disks as recording media, various types can be used, such as CDs (Compact Disks) MDs (Mini Discs), Hi-MDs, SACDs (Super Audio Compact Discs), DVDs (Digital Versatile Discs), or Blu-ray Discs.

Furthermore, various formats of music content data can be used, such as PCM (Pulse Code Modulation), WAVE, AU, AIFF, MIDI (Musical Instrument Digital Interface), ATRAC (Adaptive Transform Acoustic Coding), ATRAC3 (Adaptive Transform Acoustic Coding 3), ATRAC3plus (Adaptive Transform Acoustic Coding 3 plus), MPEG-2 (Moving Picture Experts Group 2), AAC (Advanced Audio Coding), MP3

(Moving Picture Experts Group 1 Audio Layer 3), TwinVQ (Transform-domain Weighted Interleave Vector Quantization), MS Audio, or OggVorb.

Furthermore, various formats of video data can be used, such as JPEG (Joint Photographic Experts Group), GIF (Graphics Interchange Format), PNG (Portable Network Graphics), DV (Digital Video), MPEG1 (Moving Picture Experts Group 1), MPEG2 (Moving Picture Experts Group 2), MPEG4 Visual (Moving Picture Experts Group 4 Visual), MPEG4 AVC (Moving Picture Experts Group 4 Advanced Video Coding), MPEG7 (Moving Picture Experts Group 7), AVI (Audio Video Interleaving), Real Video, Quick Time Macromedia Flash, nancy, or Windows® Video.

The content identifier can be uniquely generated from the total number of tracks of a disk or playback time of tracks. Alternatively, the content identifier can be uniquely generated from the entirety or a part of music data or video data. The method can be selected depending on the manner of use or the capability of the apparatus used. Obviously, the content identifier may be recorded in advance in association with content.

Furthermore, delimiter information generated or created by the user may be provided to an apparatus of another user, uploaded on a certain server for public access, or distributed using a recording medium.

For example, when the content data is music content data, delimiter information may be generated by automatically analyzing the music content data to detect beat or tempo and accordingly extracting points of change in beat or tempo. Furthermore, the user may input the start and end points of an introduction, the start and end points of the first chorus, the start and end point of an interlude, and so forth, so that delimiter information is generated using these pieces of information.

The content using apparatus and content using method according to the embodiment can be applied to various recording and playback apparatuses as described earlier, such as personal computers, audio apparatuses, video apparatuses, and portable AV apparatuses.

Although the embodiment has been described above in the context of an example where the content data is audio content data, video content data, or AV content data, the content data is not limited to these types, and the content data may be, for example, text data. When the content data is text data, delimiter information may be, for example, delimiters of sentences, delimiters of paragraphs, delimiters of pages, delimiters of chapters, or delimiters of volumes.

In this case, the delimiter information may be represented, for example, by the positions of bytes or the number of characters, or a difference thereof. As an example of use, when distributing text data to a portable communication terminal such as an electronic book or a cellular phone, the delimiter information is later stored in association with content data, and parts of text or paragraphs including phrases of interest are extracted and joined for use.

The video content data may be a plurality of still pictures, such as a picture book, instead of moving images. In this case, the delimiter information represents each of the still images.

It should be understood by those skilled in the art that various modifications, combinations, sub-combinations and alterations may occur depending on design requirements and other factors insofar as they are within the scope of the appended claims or the equivalents thereof.

What is claimed is:

1. A content using apparatus comprising:
an obtaining unit for obtaining delimiter information for target content data recorded on a recording medium, the delimiter information comprising a plurality of musical bars segmenting the target content data into a plurality of intervals;
an accepting unit for accepting input of an instruction by a user requesting the delimiter information to generate new content data from the target content data and specifying an order of musical bars in at least a portion of the plurality of musical bars to be used to generate the new content data;
a sensor unit for generating at least one sensor signal; and
at least one controller for generating, with at least one processor, in response to the instruction by the user and the at least one sensor signal, the new content data from the target content data subject to processing to allow playback of content of the target content data in a new manner, by reordering at least one interval from the plurality of intervals based on the specified order and the delimiter information, wherein playback of content of the target content data in a new manner further comprises synchronizing the sequential display of a plurality of still images with the plurality of musical bars and synchronizing the delimiter information with the at least one sensor signal.

2. The content using apparatus according to claim 1, wherein the obtaining unit sends a request for providing the delimiter information including an identifier of the target content data to a server apparatus on a network, and obtains the delimiter information sent from the server apparatus in response to the request.

3. The content using apparatus according to claim 1, wherein the obtaining unit obtains the delimiter information for the target content data from a file that is different from a file in which the target content data is recorded.

4. The content using apparatus according to claim 1, wherein the delimiter information is generated automatically by analyzing the target content data.

5. The content using apparatus according to claim 4, wherein the delimiter information is automatically generated by the obtaining unit and is sent to a server apparatus connected to a network.

6. The content using apparatus according to claim 4, further comprising recording unit for recording on a recording medium the delimiter information automatically generated by the obtaining unit.

7. The content using apparatus according to claim 1, wherein the content data is music data, and
wherein the delimiter information for the content data represents a point of change that is characteristic in terms of music or a meaningful music segment.

8. The content using apparatus according to claim 1, wherein the content data further comprises video data, and
wherein the delimiter information for the content data further comprises a point of change that is characteristic in terms of video or a meaningful video segment.

9. The content using apparatus according to claim 1, wherein the delimiter information is represented using one of subcode time information, a sector address, a cluster address, a time code attached to content data, a number of bytes as counted from a beginning of content data, a number of samples, a group-of-picture video frame, a sound frame, and a unit of compressed block of compressed audio data, these pieces of information being used in the recording medium having recorded the content thereon, and
wherein the delimiter information is represented using an amount relative to a predetermined reference position, a difference relative to immediately previous delimiter information, or a mathematical expression using at least one of the pieces of information.

10. The content using apparatus according to claim 1, wherein one or more types of delimiter information are associated with content data, and wherein the content using apparatus further includes selection-input accepting unit for accepting input of selection of target delimiter information from a plurality of pieces of delimiter information associated with a single piece of content data.

11. The content using apparatus of claim 1, wherein:

the sensor unit comprises a body-movement sensor for sensing a movement of the user; and playback of content of the target content data in a new manner further comprises synchronizing the delimiter information with the movement of the user.

12. The content using apparatus of claim 1, wherein:

the sensor unit further comprises an environment-information sensor for sensing changes in an environment of the user; and playback of content of the target content data in a new manner further comprises synchronizing the delimiter information with the changes in the environment of the user.

13. In a computer comprising at least one processor, a content using method comprising steps of:

with the at least one processor:

obtaining delimiter information for target content data recorded on a recording medium, the delimiter information comprising a plurality of musical bars segmenting the target content data into a plurality of intervals;

accepting input of an instruction by a user requesting the delimiter information to generate new content data from the target content data and specifying an order of musical bars in at least a portion of the plurality of musical bars to be used to generate the new content data;

generating at least one sensor signal; and generating, in response to the instruction by the user and the at least one sensor signal, by at least one controller, the new content data from the target content data subject to processing to allow playback of content the target content data in a new manner, by reordering at least one interval from the plurality of intervals based on the specified order and the delimiter information, wherein playback of content of the target content data in a new manner further comprises synchronizing the sequential display of a plurality of still images with the plurality of musical bars and synchronizing the delimiter information with the at least one sensor signal.

14. The content using method of claim 13, further comprising:

sending a request for providing the delimiter information including an identifier of the target content data to a server on a network; and obtaining the delimiter information sent from the server in response to the request.

15. The content using method of claim 13, wherein the delimiter information for the target content data from a file that is different from a file in which the target content data is recorded.

16. The content using method of claim 13, wherein the delimiter information is generated automatically by analyzing the target content data.

17. The content using method of claim 13, wherein:

the content data is music data; and the delimiter information for the content data represents a point of change that is characteristic in terms of music or a meaningful music segment.

18. The content using method of claim 13, wherein:

the content data further comprises video data; and the delimiter information for the content data further comprises a point of change that is characteristic in terms of video or a meaningful video segment.

19. The content using method of claim 13, wherein:

generating the at least one sensor signal comprises sensing a movement of the user; and playback of content of the target content data in a new manner further comprises synchronizing the delimiter information with the movement of the user.

20. A content using apparatus comprising:

an obtaining unit configured to obtain delimiter information for target content data recorded on a recording medium, the delimiter information comprising a plurality of musical bars segmenting the target content data into a plurality of intervals;

an accepting unit configured to accept input of an instruction by a user requesting the delimiter information to generate new content data from the target content data and specifying an order of musical bars in at least a portion of the plurality of musical bars to be used to generate the new content data;

a sensor unit configured to generate at least one sensor signal; and at least one controller configured to generate, in response to the instruction by the user and the at least one sensor signal, with at least one processor, the new content data from the target content data subject to processing to allow playback of content of the target content data in a new manner, by reordering at least one interval from the plurality of intervals based on the specified order and the delimiter information, wherein playback of content of the target content data in a new manner further comprises synchronizing the sequential display of a plurality of still images with the plurality of musical bars and synchronizing the delimiter information with the at least one sensor signal.

* * * * *